United States Patent
Yoshida

[19]

[11] Patent Number: 5,917,612
[45] Date of Patent: Jun. 29, 1999

[54] FACSIMILE APPARATUS FOR RECORDING INFORMATION FOR A PLURALITY OF PAGES ON ONE SHEET

[75] Inventor: Takehiro Yoshida, Tokyo, Japan

[73] Assignee: Canon Kabushiki Kaisha, Tokyo, Japan

[21] Appl. No.: 08/645,918

[22] Filed: May 14, 1996

Related U.S. Application Data

[63] Continuation of application No. 08/221,906, Apr. 1, 1994.

[30] Foreign Application Priority Data

Apr. 5, 1993 [JP] Japan .................................. 5-101909

[51] Int. Cl.[6] ...................................................... H04N 1/32
[52] U.S. Cl. ............................ 358/434; 358/438; 358/450; 382/296
[58] Field of Search ..................................... 358/450, 434, 358/435, 436, 438, 439, 468, 451; 382/284, 296, 297, 298; 395/117, 114, 102

[56] References Cited

U.S. PATENT DOCUMENTS

| | | | |
|---|---|---|---|
| 4,342,052 | 7/1982 | Rackley et al. | 358/450 |
| 4,814,894 | 3/1989 | Yoshida . | |
| 4,849,816 | 7/1989 | Yoshida . | |
| 4,928,252 | 5/1990 | Gabbe et al. | 395/102 |
| 5,051,843 | 9/1991 | Hayashi | 358/450 |
| 5,075,783 | 12/1991 | Yoshida et al. . | |
| 5,144,452 | 9/1992 | Abuyama | 358/450 |
| 5,146,343 | 9/1992 | Fujii | 358/450 |
| 5,191,429 | 3/1993 | Rourke | 358/450 |
| 5,191,440 | 3/1993 | Levine | 358/450 |
| 5,208,681 | 5/1993 | Yoshida . | |
| 5,231,516 | 7/1993 | Kamon et al. | 358/450 |
| 5,239,388 | 8/1993 | Matsumoto | 358/448 |
| 5,267,052 | 11/1993 | Bannai et al. . | |

FOREIGN PATENT DOCUMENTS 5-68907  9/1993  Japan .............................. H04N 1/387

*Primary Examiner*—Scott Rogers
*Attorney, Agent, or Firm*—Fitzpatrick, Cella, Harper & Scinto

[57] ABSTRACT

A facsimile apparatus capable of recording received information on a plurality of pages over one page of regular format cut sheets, the facsimile apparatus comprising: a receiving device for receiving image information; and a number of recording sheets setting device for setting a number of sheets of received information to be recorded on one page of the regular format cut sheet, wherein the number of sheet of the received information to be recorded on one page of the regular format cut sheet is automatically determined in accordance with fineness of the received information.

4 Claims, 26 Drawing Sheets

FACSIMILE APPARATUS FOR RECORDING INFORMATION FOR A PLURALITY OF PAGES ON ONE SHEET

This application is a continuation of application Ser. No. 08/221,906 filed Apr. 1, 1994.

BACKGROUND OF THE INVENTION

1. Field of the Invention

The present invention relates to a facsimile apparatus for recording received information for a plurality of pages on one page of a cut sheet having a regular form.

2. Description of the Prior Art

Hitherto, there have been disclosed facsimile apparatuses for recording received information for a plurality of pages on one page of a cut sheet having a regular form. According to the disclosures, a facsimile apparatus of the foregoing type that records received information is arranged in such a manner that received information having a size corresponding to two A5 size sheets is included in one A4 size cut sheet. Another facsimile apparatus has an arrangement that received information having a size corresponding to one A4 size sheet is reduced to A5 size by the receiving unit and recording is controlled so as to cause reduced information corresponding to two A5 size sheets to be included in one A4 cut sheet. That is, the foregoing apparatuses are arranged in such a way that received information for two sheets is recorded on one page of a cut sheet having a regular form, the apparatuses being arranged to turn received information in a fixed direction.

Therefore, there arises a problem in that characters are reduced too much to be recognized if fine received information is reduced from A4 size to A5 size to record received information for two sheets on one A4 size page of a cut sheet having a regular form.

What is worse, the conventional apparatuses have no double-side recording means capable of recording received information for a plurality of pages on one page of a cut sheet having a regular form. Therefore, a user cannot easily select a desired process.

SUMMARY OF THE INVENTION

An object of the present invention is to provide a facsimile apparatus which is capable of recording a plural number of sheets to meet a desire of a user in a case where received information is recorded on a cut sheet having a regular form.

Accordingly, an object of the present invention is to improve a facsimile apparatus so as to overcome the foregoing problems.

DESCRIPTION OF THE PREFERRED EMBODIMENTS

Figure 1:
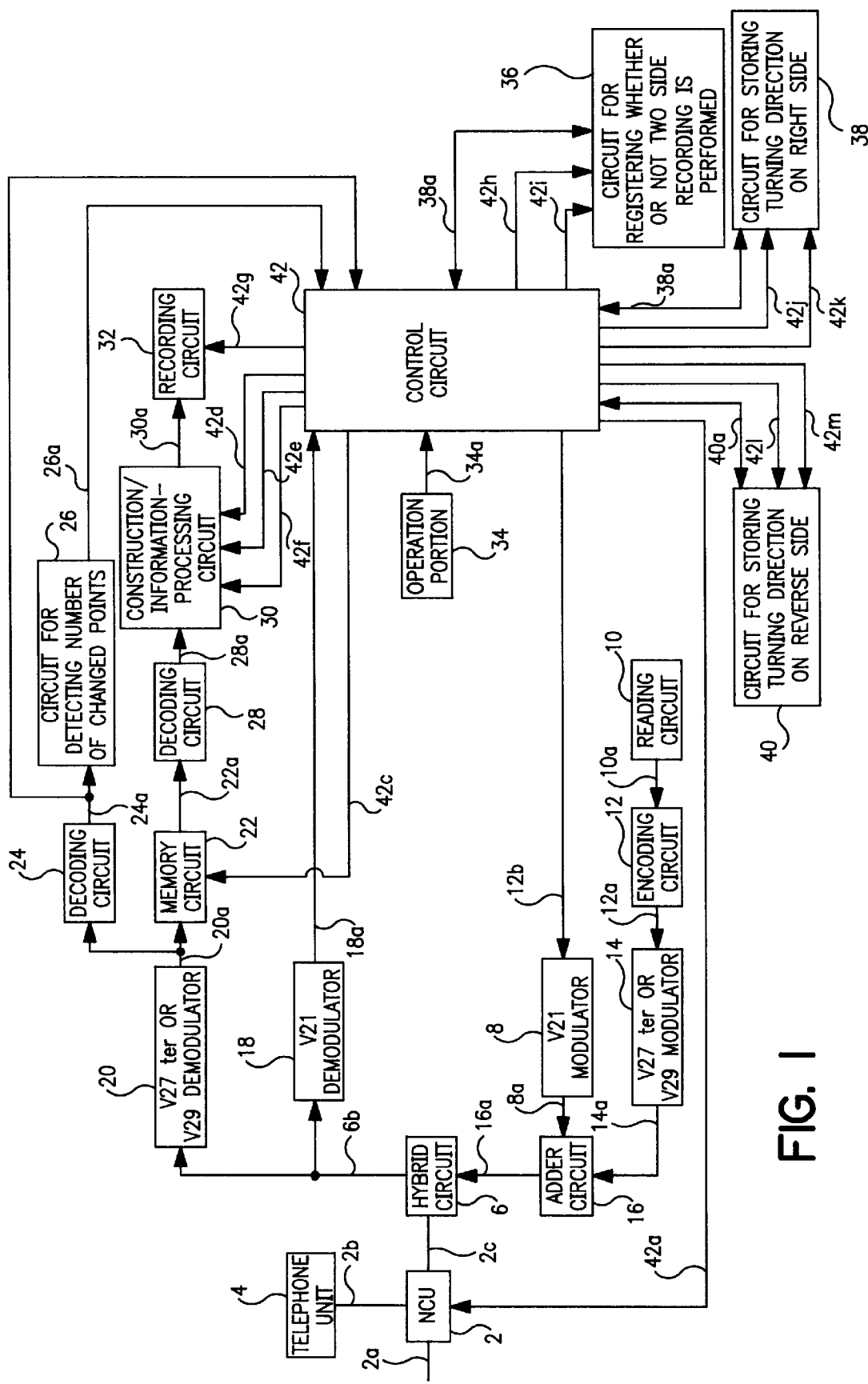
FIG. 1 is a block diagram which illustrates a first embodiment of the present invention.

FIG. 1 is a block diagram which illustrates a first embodiment of the present invention.

An NCU (Network Control Unit) 2 is disposed to use a telephone network to communicate data or the like in such a manner that the NCU 2 is connected to a terminal of the telephone network to control the connection of the telephone network, to switch data communication passages and to hold a DC loop. The NCU 2 establishes the connection between a telephone line 2a to a telephone set 4 if the level of a signal (on a signal line 42a) supplied from a control circuit 42 is "0". The NCU 2 establishes the connection between the telephone line 2a and a facsimile apparatus if the level of the signal is "1". In a usual state, the telephone line 2a is connected to the telephone set 4.

A hybrid circuit 6 separates signals in a transmission system and signals in a receipt system from each other to transmit the signals supplied from an adder circuit 16 to the telephone circuit 2a through the NCU 2. The hybrid circuit 6 receives signals transmitted from the transmitting side apparatus through the NCU 2 to transmit the signals to a demodulator 20 and a V21 demodulator 18 through a signal line 6a.

A V21 modulator 8 is a modulator adapted to known CCITT recommendation V21 and arranged to modulate a procedure signal (on a signal line 42*b*) supplied from the control circuit 42 to transmit it to the adder circuit 16 through a signal line 8*a*.

A reading circuit 10 sequentially reads image signals of a transmitted original document for one line in the main scanning direction to make binary signal trains representing white and black, the reading circuit 10 transmitting data of the binary signal train to an encoding circuit 12 through a signal line 10*a*. The reading circuit 10 is composed of an image sensing device, such as a CCD (a Charge Coupled Device), and an optical system.

The encoding circuit 12 receives read data transmitted to the signal line 10*a* to encode (MH-encode or MR-encode) read data, the encoding circuit 12 being arranged to transmit encoded data through the signal line 12*a*.

A V27 ter or V29 modulator 14 receives encoded data from the signal line 12*a* to modulate it on the basis of known CCITT recommendation V27 ter (differential phase modulation) or V29 (orthogonal modulation), the V27 ter or V29 modulator 14 being arranged to transmit modulated data to the adder circuit 16 through a signal line 14*a*.

The adder circuit 16 is a circuit for adding outputs from the modulators 8 and 14 to each other. The output from the adder circuit 16 is transmitted to the hybrid circuit 6.

A V21 demodulator 18 demodulates data in accordance with known CCITT recommendation V21. The demodulator 18 receives the procedure signal from the hybrid circuit 6 through the signal line 6*a* to V21-demodulate it, the V21 demodulator 18 being arranged to transmit demodulated data to the control circuit 42 through a signal line 18*a*.

A V27 ter or V29 demodulator 20 is arranged to perform demodulation in accordance with known CCITT recommendation V27 ter or V29. The demodulator 20 receives demodulated image signal supplied from the hybrid circuit 6 to demodulate it, the demodulator 20 being arranged to transmit demodulated data to a memory circuit 22 and a decoding circuit 24 through a signal line 20*a*.

The memory circuit 22 is under control performed through a signal line 42*c* connected to the control circuit 42, stores demodulated data transmitted to the signal line 20*a* and transmits stored data to a demodulating circuit 28 through a signal line 22*a*.

The decoding circuit 24 is a circuit for decoding (MH-decoding or MR-decoding) data supplied through the signal line 20*a* and transmitting decoded data to a circuit 26 for detecting the number of changed points and the control circuit 42 through a signal line 24*a*. When data received from the memory circuit 22 is accumulated, the control circuit 42 receives information present on the signal line 24*a* to discriminate the state of received data.

The circuit 26 for detecting the number of changed points receives data from the signal line 24*a* to detect the number of changed points for each line and to transmit the results of the detection to a signal line 26*a*.

A decoding circuit 28 is a circuit for decoding (MH-decoding or MR-decoding) data received from the signal line 22*a*, the decoding circuit 28 being arranged to transmit data to a reduction/information-processing circuit 30 through a signal line 28*a*.

The reduction/information-processing circuit 30 receives decoded data transmitted to the signal line 28*a* to reduce supplied data, determine the recording position, determine the number of sheets of received information to be recorded on one page of a cut sheet having a regular form and determine the direction of turning in a case where received information for a plurality of sheets is recorded on one page of a cut sheet having a regular form under control performed through signal lines 42*d*, 42*e* and 42*f*. The reduction/information-processing circuit 30 transmits processed information data to a signal line 30*a*.

A recording circuit 32 receives data transmitted to the signal line 30*a* to sequentially record data for each line on either side of a recording paper sheet if a signal, the level of which is "0", has been transmitted to a signal line 42*g*. If a signal, the level of which is "1", has been transmitted to the signal line 42*a*, the recording circuit 32 sequentially records data for each line on the two sides of the recording paper sheet.

An operation portion 34 has a ten key, a one-touch dial key, shortened dial keys and a variety of registered keys for determining whether or not two side recording is performed, whether or not a margin for filing is created and whether or not received information for plural pages is recorded on one page of a cut sheet having a regular form and determining the turning direction. When the foregoing key of the operation portion 34 is depressed, information of the depressed key is transmitted to a signal line 34*a*.

A register circuit 36 is a circuit for registering the setting whether or not the two side recording operation is performed or whether or not the one side recording operation is performed. If a registration into the register circuit 36 is made, a signal, the level of which is "0", is transmitted to a signal line 36*a* in a case where the two side recording operation is not performed. In a case where the two side recording operation is performed, a signal, the level of which is "1", is transmitted to the signal line 36*a*. Then, the register circuit 36 generates writing pulses on a signal line 42*h*. When data registered in the register circuit 36 is read, reading pulses are generated on a signal line 42*i* so that information registered in the register circuit 36 is transmitted to the signal line 36*a*.

A storage circuit 38 is a circuit for storing the turning direction in accordance with the determined number of sheets of received information to be recorded on one sheet when recording to the right side of the recording paper sheet is performed. In this embodiment, two cases are considered that received information on two sheets is recorded on one page of a cut sheet having a regular form and that received information on four sheets is recorded on one page of a cut sheet having a regular form. If data is stored on the storage circuit 38, information of the number of sheets to be recorded on one page of a cut sheet is transmitted to a signal line 38*a*, and then the recording order (the sequential order set to correspond to the upper portion and the lower portion of the recording paper sheet) is transmitted in the case where two sheets of information are recorded. Then, the turning directions corresponding to the upper portion and the lower portion of the recording paper sheet are transmitted. In a case where information of four sheets is recorded, the recording order (the recording order corresponding to the upper left portion, upper right portion, lower left portion and the lower right portion of the recording paper sheet) of received information is transmitted, and then turning directions corresponding to the upper left portion, upper right portion, lower left portion and the lower right portion of the recording paper sheet are transmitted. Then, writing pulses are generated on a signal line 42*j*.

When information stored in the storage circuit 38 is read, information about the number of sheets to be recorded on one page of a cut sheet having a regular form is transmitted to the signal line 38*a*. When the reading pulses are generated on a signal line 42k afterwards, the recording order and the turning direction of received information are transmitted to the signal line 38a.

A storage circuit 40 is a circuit for storing the turning direction in accordance with the determined number of sheets of received information to be recorded on one page of a cut sheet. In this embodiment, two cases are considered that received information on two sheets is recorded on one page of a cut sheet having a regular form and that received information on four sheets is recorded on one page of a cut sheet having a regular form. If data is stored on the storage circuit 40, information of the number of sheets to be recorded on one page of a cut sheet is transmitted to a signal line 40a, and then the recording order (the sequential order set to correspond to the upper portion and the lower portion of the recording paper sheet) is transmitted in the case where two sheets of information is recorded. Then, the turning directions corresponding to the upper portion and the lower portion of the recording paper sheet is transmitted. In a case where information on four sheets is recorded, the recording order (the recording order corresponding to the upper left portion, upper right portion, lower left portion and the lower right portion of the recording paper sheet) of received information is transmitted, and then turning directions corresponding to the upper left portion, upper right portion, lower left portion and the lower right portion of the recording paper sheet are transmitted. Then, writing pulses are generated on a signal line 42r.

When information stored in the storage circuit 40 is read, information about the number of sheets to be recorded on one page of a cut sheet having a regular form is transmitted to the signal line 40a. When the reading pulses are generated on a signal line 42m afterwards, the recording order and the turning direction of received information are transmitted to the signal line 40a.

The control circuit 42 according to this embodiment mainly performs control in such a manner that it temporarily stores received information in the memory, previously recognizes the fineness of received information at the time of receiving information, automatically discriminates the number of sheets of received information to be recorded on one page of a cut sheet having a regular form and performs the recording operation.

Figure 2:
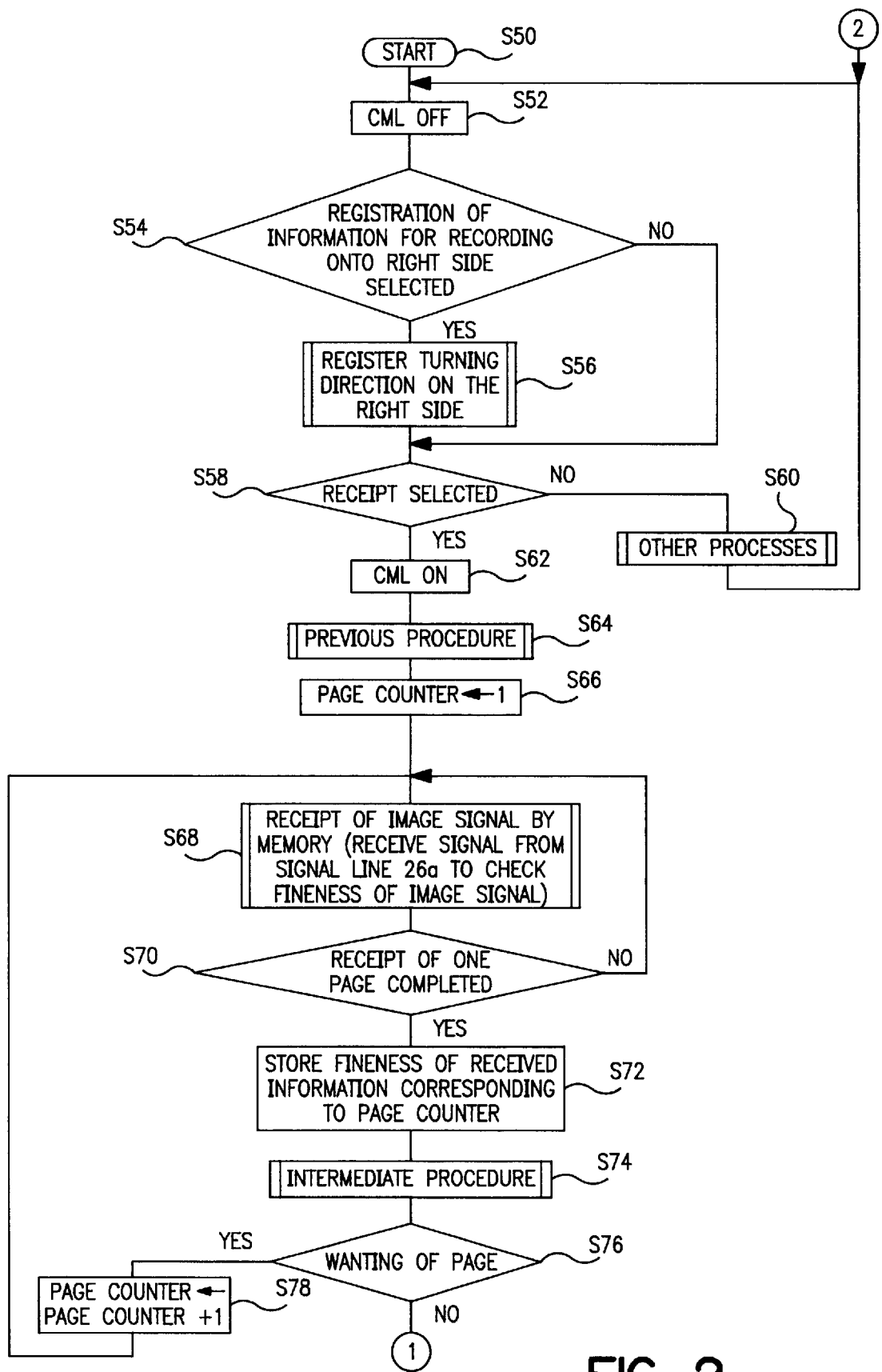
FIG. 2 is a flow chart which illustrates the operation of the first embodiment.
Figure 3:
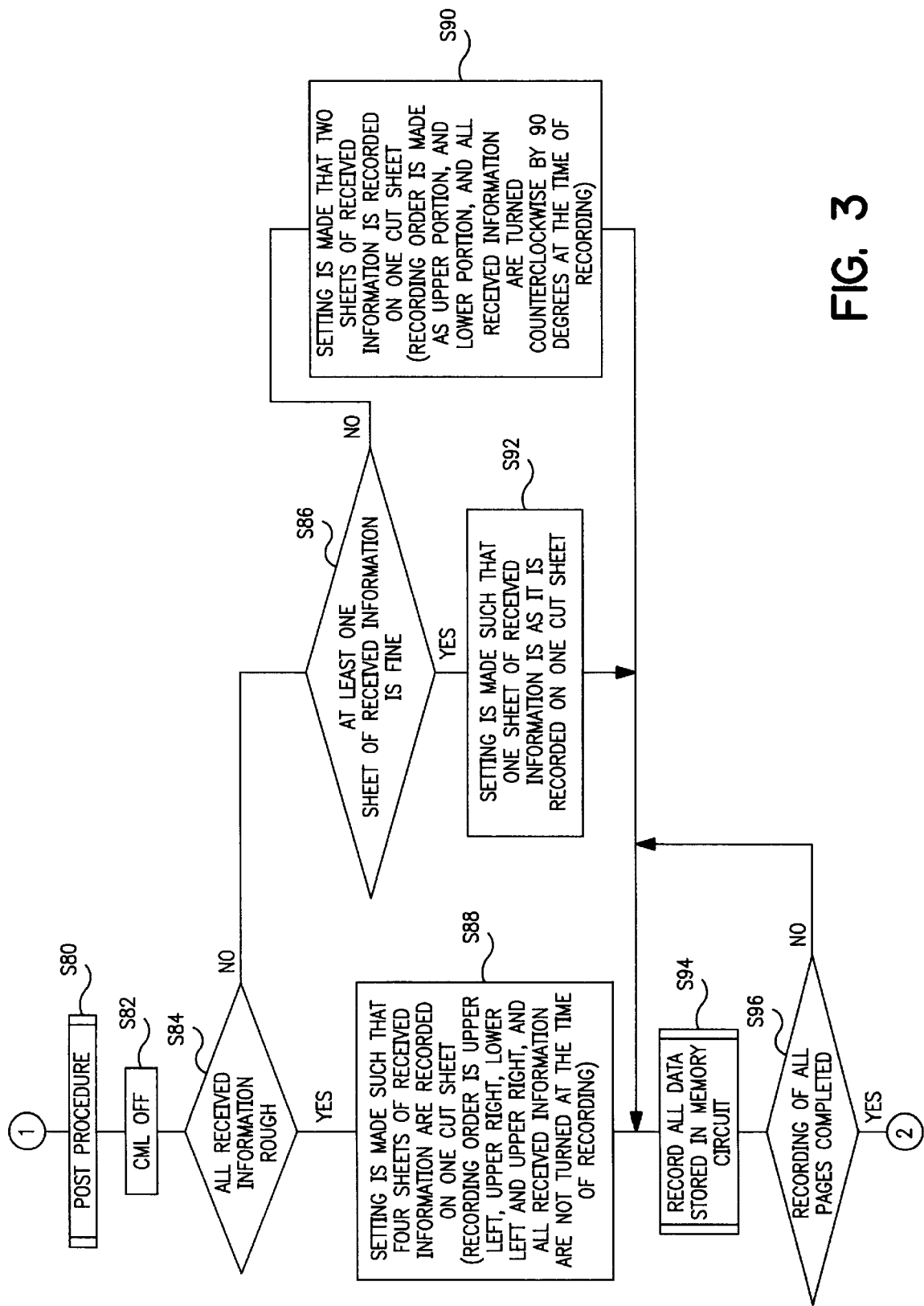
FIG. 3 is a flow chart which illustrates the operation of the first embodiment.

FIGS. 2 and 3 are flow charts which illustrate the operation of this embodiment.

First, a signal, the level of which is "0", is transmitted to the signal line 42a in step S52 to deactivate the CML. In step S54, discriminations are made whether or not registration of the recording position at which received information is recorded and that of the turning direction of the received information to be recorded on the right side i.e., front side, of the recording paper sheet have been made. If they have been selected, the flow proceeds to step S56 in which the recording position and the direction in which the received information is turned are registered into the storage circuit 38. If they are not selected, the flow proceeds to step S58.

In step S58, whether or not the information receipt has been selected is discriminated. If the information receipt has not been selected, the flow proceeds to step S60 in which other processes are performed. If the information receipt has been selected, the flow proceeds to step S62 in which a signal, the level of which is "1", is transmitted to the signal line 42a to activate the CML.

In step S64, previous procedures are performed, and "1" is, in step S66, set to a page counter for counting the pages received by the memory. In step S68, received information is stored in the memory circuit 22 through the signal line 42c. In the memory circuit 22, the signal on the signal line 26a is received to check the fineness of an image signal in accordance with the number of changed points.

In step S70, a discrimination is made whether or not information for one page has been completed. If information for one page has been received, the flow proceeds to step S72. If receipt of information for one page has not been completed, the flow returns to step S68.

In step S72, the fineness of received information is stored to correspond to the page counter. In step S74, intermediate procedures are performed, and in step S76 a discrimination is made whether or not a next page is present. If the next page is present, the flow proceeds to step S78 in which the value of the page counter is increased by one. If the next page is not present, post-procedures are performed in step S80. In step S82, a signal, the level of which is "0", is transmitted to the signal line 42a to deactivate the CML.

In steps S84 and S86, the fineness of received information is checked. If one or more fine information sheets are present, the flow proceeds to step S92. If all sheets are rough, the flow proceeds to step S88. In the residual cases, the flow proceeds to step S90.

In step S88, setting of the reduction/information-processing circuit 30 is made in such a manner that four sheets of received information are recorded on one cut sheet. In this embodiment, setting of the reduction/information-processing circuit 30 is performed in accordance with the recording order and the turning direction registered in the storage circuit 38. The foregoing setting operation is performed in such a manner that the recording order is set in the descending order and all received information items are turned counterclockwise in an angular degree of 90°. Then, the flow proceeds to step S94.

In step S90, the reduction/information-processing circuit 30 is set to record two sheets of received information on one cut sheet. In this state, the recording order and the turning direction registered in the storage circuit 38 are used to set the reduction/information-processing circuit 30. The setting is made in this way that the recording order as upper portion and lower portion is employed and all received information items are counterclockwise turned by 90° at the time of recording information. Then, the flow proceeds to step S94.

In step S92, a decision is made to record one sheet of received information on one cut sheet. Then, the flow proceeds to step S94.

In step S94, all data items stored in the memory circuit 22 are recorded through the signal line 42c. In step S96, a discrimination is made whether or not all pages stored in the memory circuit 22 have been recorded. If all pages have been recorded, the flow returns to step S52. If all pages have not been recorded, the flow returns to step S94.

Although the first embodiment is arranged in such a manner that all received information items for the same number of the received sheets are recorded on one page of a cut sheet having a regular form, a different number of received sheets may be recorded on one page of a cut sheet having a regular form during one communication operation to correspond to the fineness of received information.

The first embodiment may be arranged in such a manner that received information is recorded on one page of a cut sheet having a regular form if one sheet of information has been received, and a selection can be made if two sheets of information have been received from two processes, that received information is recorded on one page of a cut sheet having a regular form or received information is recorded on one page of a cut sheet having a regular form.

Although the first embodiment is arranged in such a manner that a plurality of sheets of received information are recorded on one page of a cut sheet having a regular form to correspond to the fineness of received information, an arrangement may be employed in which a plurality of numbers of sheets of received information to be recorded on one page of a cut sheet having a regular form can be set from outside.

Figure 4:
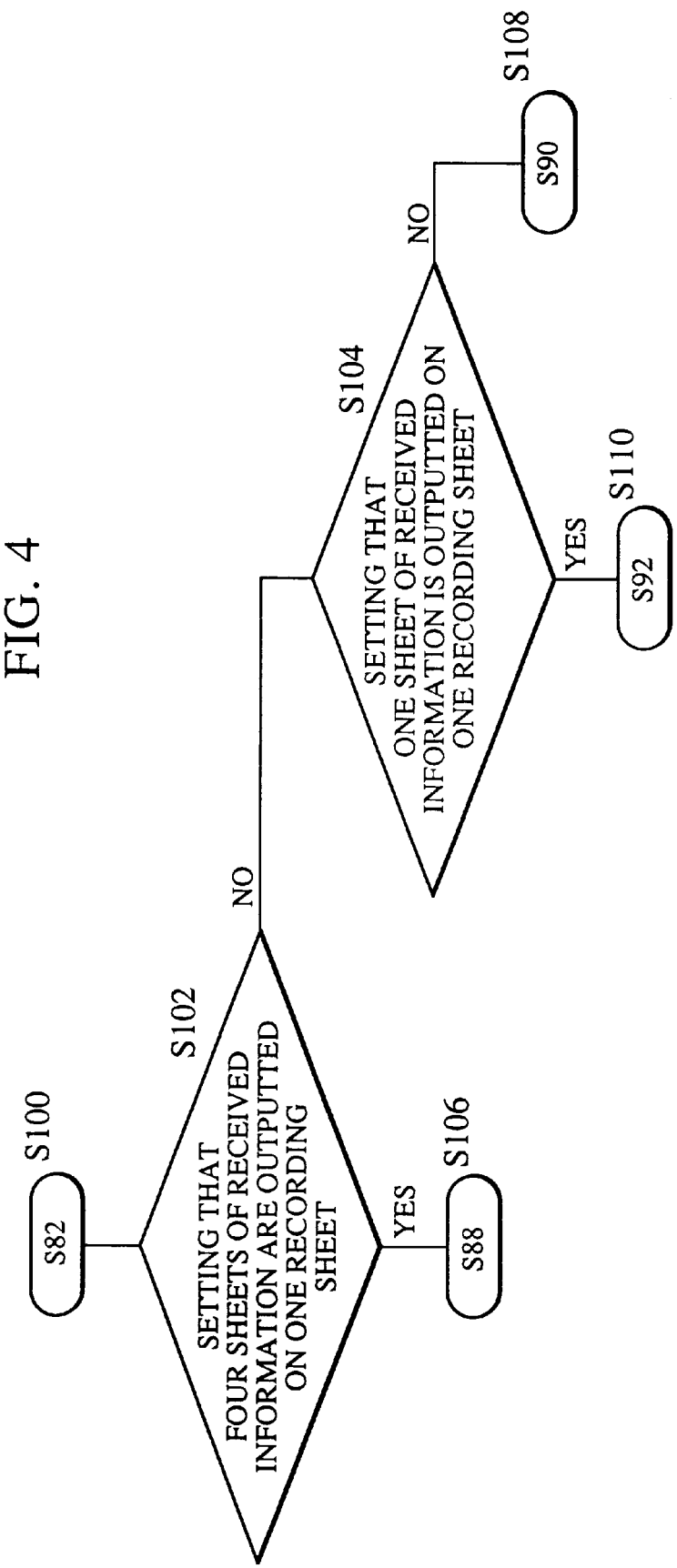
FIG. 4 is a flow chart which illustrates the operation of a first modification of the first embodiment.

FIG. 4 is a flow chart which illustrates control of the foregoing type and in which portions different from those shown in FIGS. 2 and 3 are shown.

Step S100 corresponds to step S83 shown in FIG. 2. In next steps S102 and S104, an input is made through the operation portion 34 to discriminate the number of sheets of received information to be recorded on one cut sheet. If four sheets have been selected, the flow proceeds to step S106 (corresponding to step S88). If two sheets have been selected, the flow proceeds to step S108 (corresponding to step S90). If one sheet has been selected, the flow proceeds to step S110 (corresponding to step S92).

The first embodiment may be arranged in such a manner that a marginal portion is formed on the left side of information to be recorded to make the recording method to be convenient to file information.

Although the first embodiment is arranged in such a way that information is recorded on only the right side i.e., front side, of the recording sheet, an apparatus may be constituted which is capable of recording information on two sides of the recording sheet. If information is recorded on the two sides of the recording sheets in such a manner that two sheets of received information are recorded on one sheet for example, different recording methods are employed in such a way that received information to be recorded on the front side is counterclockwise turned by 90 and the reverse side is clockwise turned by 90°. Therefore, the arrangement must be made in such a manner that the directions, in which the images are recorded on the front side and the reverse side, can be individually set. Furthermore, holes for filing must be formed in such a manner that those for the front side are formed on the left side and those for the reverse side are formed on the right side.

Figure 5:
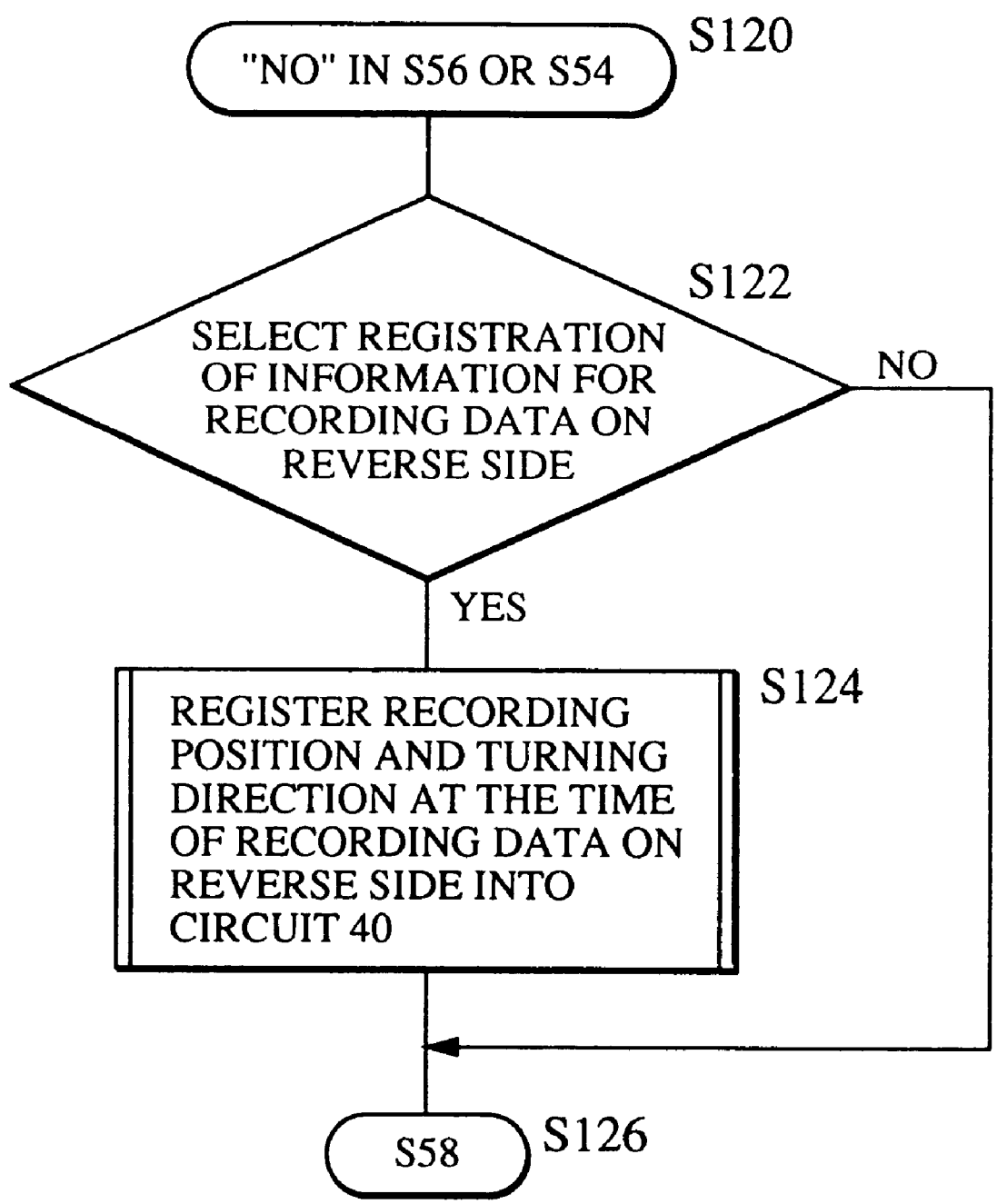
FIG. 5 is a flow chart which illustrates the operation of a second modification of the fist embodiment.

FIG. 5 is a flow chart which illustrates control to be performed in the foregoing case and different from those shown in FIGS. 2 and 3.

Referring to FIG. 5, step S120 corresponds to a negative case made in step S56 or step S54 shown in FIG. 2. In step S122, a discrimination is made whether or not the registrations of the recording positions and received information at the time of recording information on the reverse side of the recording sheet have been selected. If they have been selected, the flow proceeds to step S124 in which the recording position and the turning direction of received information to be recorded on the reverse side of the recording sheet are registered into the recording circuit 40.

If they have not been selected, the flow proceeds to step S126 in which the process in step S58 is performed. In this case, recording on the reverse side is as well as performed in accordance with information registered in the recording circuit 40 in steps S88 and S90 shown in FIG. 3.

The foregoing structure is arranged in such a manner that the number of sheets of received information to be recorded on one page of a cut sheet having a regular form, the recording position and the turning direction of received information are set from the receiving side. However, the foregoing information items may be notified from the transmitting side to the receiving side and the receiver may perform the recording operation in accordance with the notified information. The foregoing notification from the transmitting side to the receiving side can be performed in accordance with the previous procedures to be performed in step S64 shown in FIG. 2.

A second embodiment of the present invention will now be described.

Facsimile apparatuses for recording information on the conventional recording paper sheet having a regular size are categorized into the following three types.

A first type is represented by a thermal transference recording facsimile apparatus for recording information on a cut sheet having a regular form. The foregoing facsimile apparatus decodes received information in a real time manner to record the same. If received information cannot be included in one page, the recording procedure proceeds to the operation of recording the second sheet regardless of the residual quantity of received information.

A second type apparatus is represented by a BJ (ink jet) recording facsimile apparatus for recording information on a cut sheet having a regular size, the second type apparatus being arranged to decode a predetermined number of lines and the predetermined number of lines are recorded collectively. If received information cannot be included in one page in the foregoing case, recording of the second page is started regardless of the residual quantity of received information similarly to the first type apparatus.

A third type apparatus is represented by an LBP recording facsimile apparatus for recording data on a recording paper sheet having a regulated size. Since the LBP recording operation requires that one page is recorded at a predetermined speed, data is recorded at a predetermined speed after data for one page has been received. Since receipt of one page has been completed, the number of received lines can be recognized. If a discrimination has been made in accordance with the recognized number of lines that received information exceeds the A4 size by 1 cm or less, rear end information is omitted and data is recorded on the recording paper at the same magnification. If received information exceeds the A4 size by a degree ranging from 1 cm to 2.97 cm, data is recorded by reducing the original at a reduction ratio of 90%. If received information exceeds the A4 size by a degree larger than 2.97 cm, original data is divided into two or more pages.

However, the foregoing operation requires that data on the previous page is decoded, that data, which is being received, is decoded and error checking is performed in a state where the recording process is performed, and line information representing that decoded data has been correctly received is encoded and stored in the memory. Therefore, about two hardware systems (CODEC circuits) must be used, causing the cost of the system to be enlarged excessively.

Accordingly, the applicant of the present invention has disclosed a structure having simplified hardware for performing the error check (see Japanese Patent Application No. 4-186,369). However, use of the foregoing structure encounters a fact that the number of correctly received lines cannot accurately be recognized. Therefore, if received information cannot be recorded within one page, recording of the second page is started regardless of the residual quantity of received information similarly to the first and second methods. Also in the ECM receiving process, the number of received lines cannot be recognized although frame data can be checked by FCS check of HDLC.

As described above, the first type apparatus, that is the thermal transference recording facsimile apparatus, the second type apparatus, that is the BJ recording facsimile apparatus, and the third type apparatus, that is the LBP recording facsimile apparatus having the simplified hardware (ECM receipt mode included) encounter a fact that, if received information cannot be recorded within one page of regulated form paper, recording of the second page is started regardless of the residual quantity of received information. Therefore, the recording paper is wasted. Moreover, a problem arises in that recorded information cannot easily be recognized.

Therefore, the second embodiment provides a facsimile apparatus which is capable of including received information within one page of the regulated size.

Figure 6:
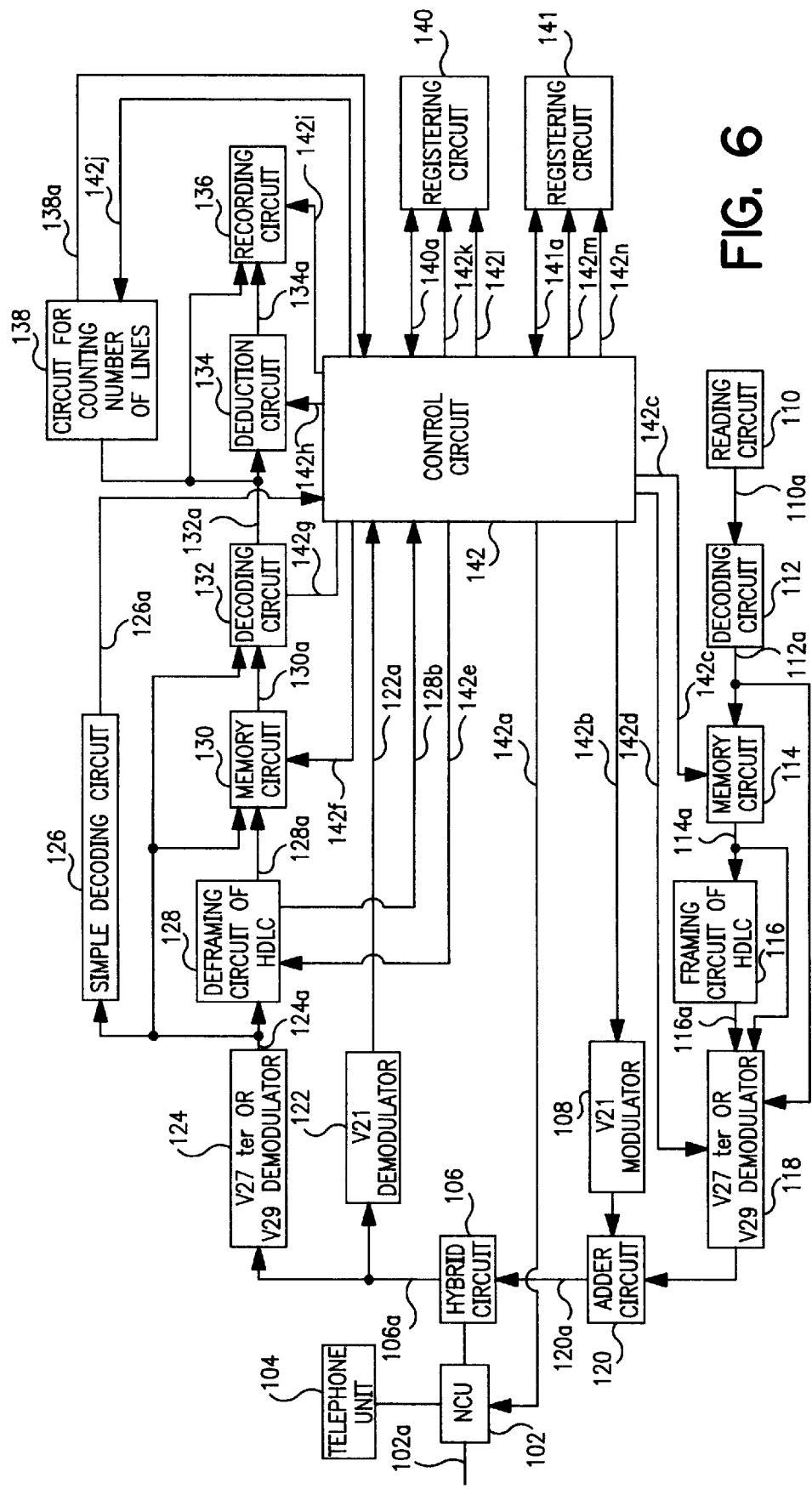
FIG. 6 is a block diagram which illustrates a second embodiment of the present invention.

FIG. 6 is a block diagram which illustrates the second embodiment.

An NCU (Network Control Unit) 102 is disposed to use a telephone network to communicate data or the like in such a manner that the NCU 102 is connected to a terminal of the telephone network to control the connection of the telephone network, to switch data communication passages and to hold a DC loop. The NCU 102 establishes the connection between a telephone line 102a to a telephone set 104 if the level of a signal (on a signal line 142a) supplied from a control circuit 142 is "0". The NCU 102 establishes the connection between the telephone line 102a and a facsimile apparatus if the level of the signal is "1". In the usual state, the telephone line 102a is connected to the telephone set 104.

A hybrid circuit 106 separates signals in a transmission system and signals in a receipt system from each other to transmit the signals supplied from an adder circuit 120 to the telephone circuit 102a through the NCU 102. The hybrid circuit 106 receives signals transmitted from the transmitting side through the NCU 102 to transmit the signals to a demodulator 124 and a V21 demodulator 122 through a signal line 106a.

A V21 modulator 108 is a modulator adapted to known CCITT recommendation V21 and arranged to modulate a procedure signal (on a signal line 142b) supplied from the control circuit 142 to transmit it to the adder circuit 120 through a signal line 108a.

A reading circuit 110 sequentially reads image signals of a transmitted original document for one line in the main scanning direction to make binary signal trains representing white and black, the reading circuit 110 transmitting data of the binary signal train to an encoding circuit 112 through a signal line 110a. The reading circuit 110 is composed of an image sensing device, such as a CCD (a Charge Coupled Device), and an optical system.

The encoding circuit 112 receives read data transmitted to the signal line 110a to encode (MH-encode or MR-encode) read data, the encoding circuit 112 being arranged to transmit encoded data through the signal line 112a.

The memory circuit 114 is under control performed through a signal line 142c connected to the control circuit 142, stores demodulated data transmitted to the signal line 112a and transmits stored data to a HDLC framing circuit 116 and the modulating circuit 118.

The HDLC framing circuit 116 receives data from the signal line 114a to frame the HDLC and transmits data of framing to the modulator 118 through a signal line 116a.

A V27 ter or V29 modulator 118 receives a signal from a signal line 112a if a signal, the level of which is "0", is transmitted from the control circuit 142 to a signal line 142d. It receives a signal from a signal line 114a if a signal, the level of which is "1", is transmitted. It receives a signal from a signal line 116a if a signal, the level of which is "2", is transmitted. The V27 ter or V29 modulator 118 modulates the supplied signal on the basis of known CCITT recommendation V27 ter (differential phase modulation) or V29 (orthogonal modulation), the V27 ter or V29 modulator 118 being arranged to transmit modulated data to the adder circuit 120 through a signal line 118a.

The adder circuit 120 is a circuit for adding outputs from the modulators 108 and 118 to each other. The output from the adder circuit 120 is transmitted to the hybrid circuit 106.

A V21 demodulator 122 demodulates data in accordance with known CCITT recommendation V21. The demodulator 122 receives the procedure signal from the hybrid circuit 106 through the signal line 106a to V21-demodulate it, the V21 demodulator 122 being arranged to transmit demodulated data to the control circuit 142 through a signal line 122a.

A V27 ter or V29 demodulator 124 is arranged to perform demodulation in accordance with known CCITT recommendation V27 ter or V29. The demodulator 124 receives demodulated image signal supplied from the hybrid circuit 106 to demodulate it, the demodulator 124 being arranged to transmit demodulated data to a simply-decoding circuit 126, a HDLC deframing circuit 128, a memory circuit 130 and a decoding circuit 132.

The simply-decoding circuit 126 receives decoded data transmitted to a signal line 124a to decode in the MH mode and detect an EOL signal in the MH mode and an EOL signal in the MR mode, the simply-decoding circuit 126 being arranged to transmit the results to a signal line 126a.

The HDLC deframing circuit 128 receives data transmitted to the signal line 124a under control performed through a signal line 142e to deframe HDLC, the HDLC deframing circuit 128 being arranged to transmit the result to a signal line 128a. Information representing detection of the end of one frame and information representing whether or not one frame has been received correctly are transmitted to the signal line 128b.

The memory circuit 130 stores demodulated data transmitted to the signal line 124a or a signal line 128a under control performed through a signal line 142f, the memory circuit 130 being arranged to transmit stored data to a signal line 130a.

The decoding circuit 132 receives the signal from the signal line 124a when a signal, the level of which is "0", has been transmitted to a signal line 142g. When a signal, the level of which is "1", has been transmitted to the signal line 142g, it receives a signal from the signal line 130a to decode (MH-decode or MR-decode) the supplied signal, the decoding circuit 132 being arranged to transmit decoded data to the signal line 132a.

A reduction circuit 134 is a circuit for reducing data transmitted to the signal line 132a in only the sub-scanning direction at a reduction ratio transmitted to a signal line 142h, the reducing circuit 134 being arranged to transmit reduced data to the signal line 134a.

A recording circuit 136 does not perform the recording operation when a signal, the level of which is "0", has been transmitted to a signal line 142i. The recording circuit 136 receives data transmitted to the signal line 132a when a signal, the level of which is "1", has been transmitted to the signal line 142i. When a signal, the level of which is "2", has been transmitted to the signal line 142i, it receives data transmitted to the signal line 134a to sequentially record each line in an intermittent manner, or in block units or at the same speed.

A circuit 138 for counting the number of lines receives decoded data transmitted to the signal line 132a after a clear pulse has been generated in a signal line 142j to count the number of lines, the circuit 138 for counting the number of lines being arranged to transmit the counted number of lines to a signal line 138a.

A registration circuit 140 is a circuit for registering whether or not one touch dialing is performed and whether or not reduction is performed. In this embodiment, 36 one touch dials can be registered in the registration circuit 140. When registration into the registration circuit 140 is performed, data is transmitted to a signal line 140a in accordance with the following format. The following outputs are sequentially made: one touch number (one of numbers from 01 to 36, for example, 01), two spaces, telephone number (for example, 03-3444-2222), one space and 1 if reduction recording is performed or 0 if reduction recording is not performed. Then, a write pulse is generated in a signal line 142k. When data registered in the registration circuit 140 is read, one touch number (for example, 01) is transmitted to the signal line 140a, and then a read pulse is generated in a signal line 142r. As a result, the registration circuit 140 transmits data in accordance with the following format: registered telephone number (for example, 03-3444-2222) corresponding to the one touch number (for example, 01), one space, and information whether or not reduction recording is performed (if reduction recording is performed, 1 is transmitted) are transmitted to the signal line 140a.

The registration circuit 141 is a circuit for registering whether or not shortened dial is registered and whether or not reduction recording is performed. In this embodiment, 100 shortened dials can be registered. When registration into the registration circuit 141 is performed, data is transmitted to the signal line 141a in accordance with the following format: shortened dial number (one of numbers from 00 to 99, for example, 00), one space, telephone number (for example, 03-3123-4567), one space, 1 if reduced recording is performed, 0 if reduced recording is not performed are sequentially transmitted. Then, a write pulse is generated in a signal line 142m. When data registered in the registration circuit 141, the shortened dial number (for example, 00) is transmitted to the signal line 141a, and a read pulse is generated in a signal line 142n. As a result, the registration circuit 141 transmits, to the signal line 141a, the telephone number (for example, 03-3123-4567) registered to correspond to the shortened dial number (for example, 00), one space and information (0 if reduced recording is not performed) representing whether or not reduced recording is performed.

The control circuit 142 according to this embodiment controls the apparatus as follows: when receipt of information from the transmitter side corresponding to the one touch dial or the shortened dial is selected through the operation portion (omitted from illustration), registration is made whether or not data is recorded on the regular size recording paper at the same magnification or whether or not data is recorded at a reduction ratio of 90% in only the sub-scanning direction. If receipt has been actually selected, for example, the lower 6 digits of the TSI signal transmitted from the transmitter side apparatus and the lower 6 digits registered as the one touch dial or the shortened dial are subjected to a comparison. If they coincide with each other, same magnification recording or reduced recording at a reduction ratio of 90% is performed in accordance with information registered in the one touch dial or the shortened dial whether or not reduced recording is performed. If the TSI signal is not transmitted from the connected apparatus or no coincidence detecting apparatus is present, same magnification recording is performed. In this embodiment, receipt is performed by thermal transference recording and real time recording is performed.

Figure 7:
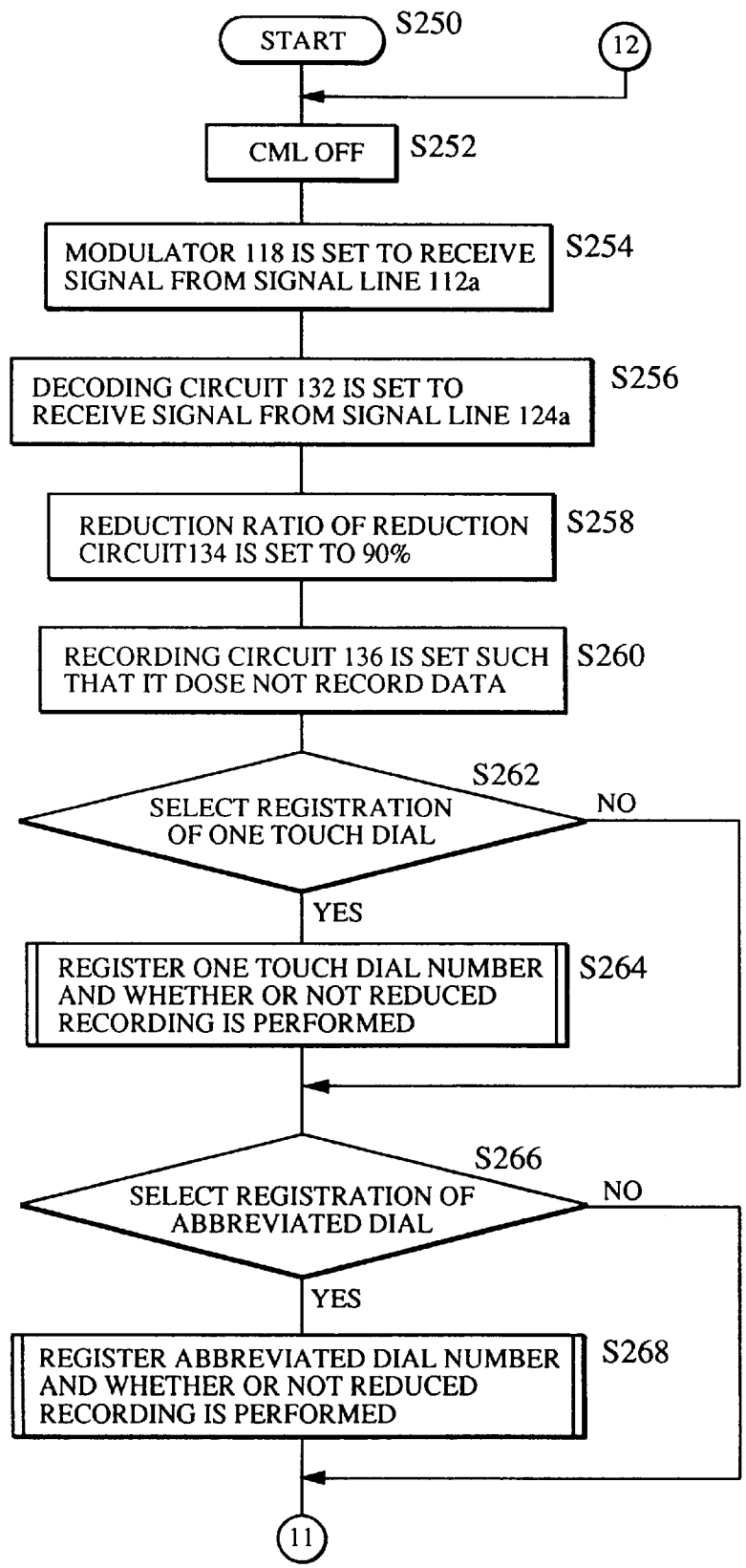
FIG. 7 is a flow chart which illustrates the operation of the second embodiment.
Figure 8:
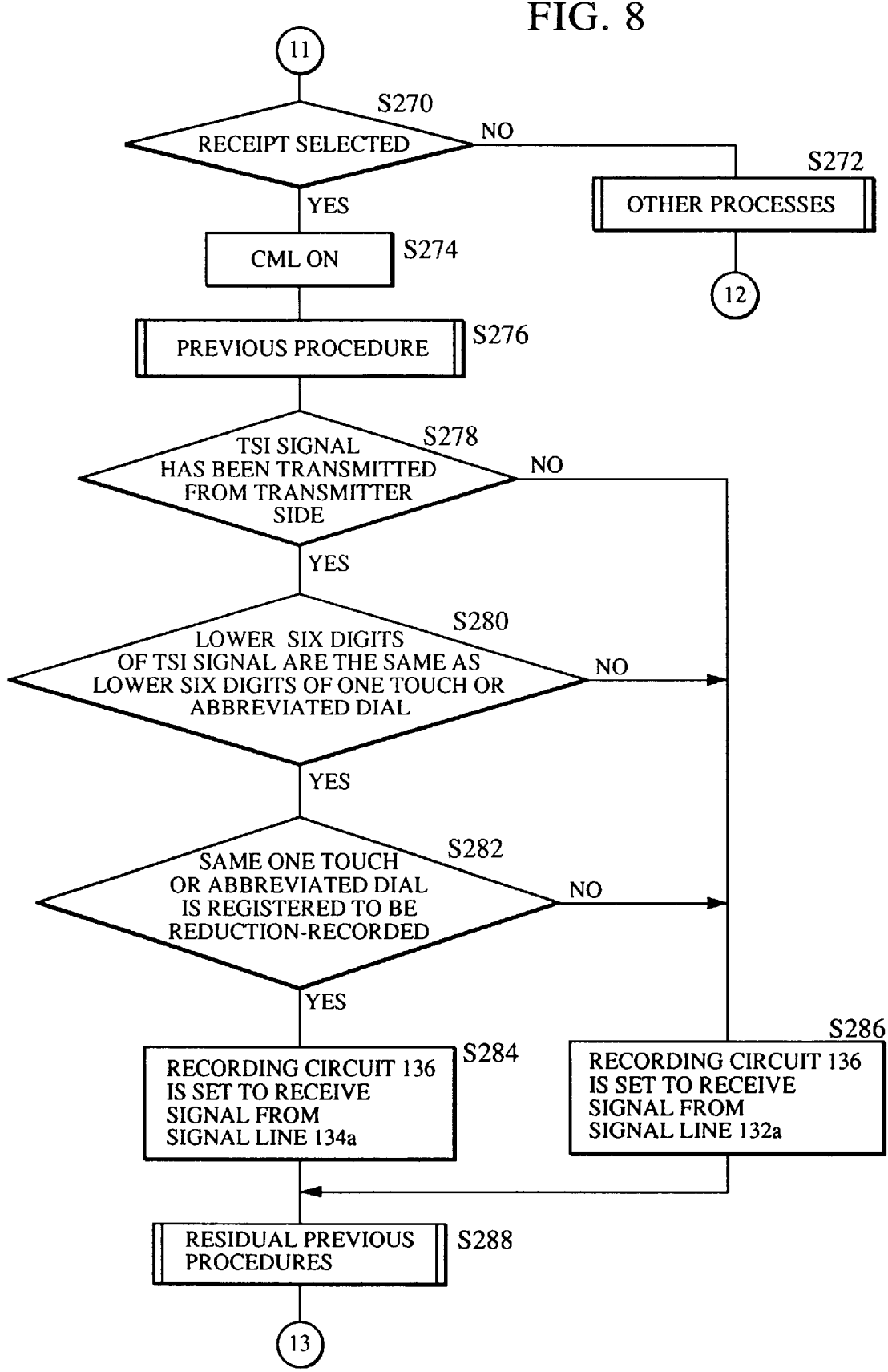
FIG. 8 is a flow chart which illustrates the operation of the second embodiment.
Figure 9:
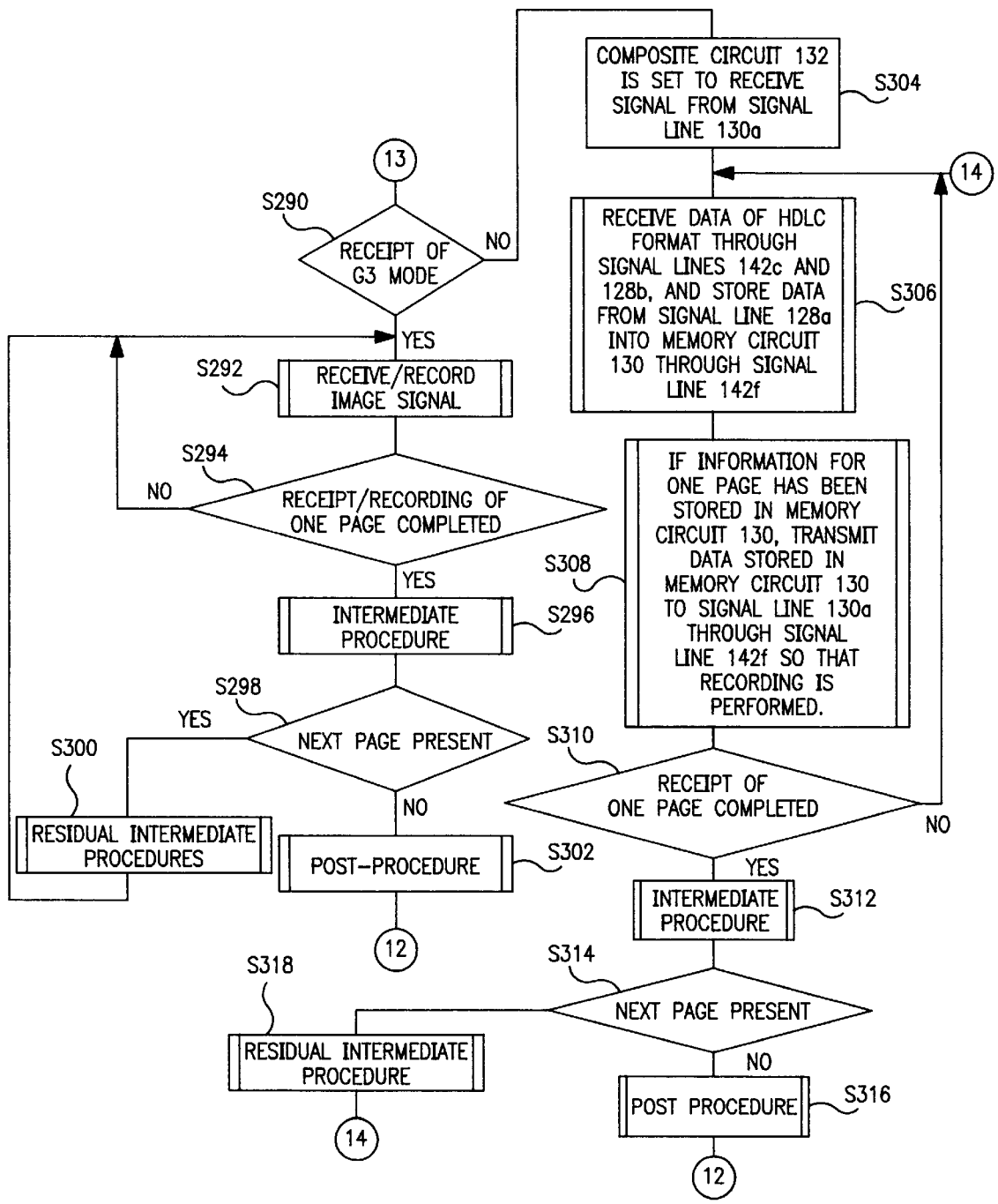
FIG. 9 is a flow chart which illustrates the operation of the second embodiment.

FIGS. 7 to 9 illustrate a flow chart of the operation of the second embodiment.

In step S252, a signal, the level of which is "0", is transmitted to the signal line 142a to deactivate CML. In step S254, a signal, the level of which is "0", is transmitted to the signal line 142d so that setting is made in such a manner that the modulator 118 receives a signal from the signal line 112a. In step S256, a signal, the level of which is "0", is transmitted to the signal line 142g so that setting is made in such a manner that the decoding circuit 132 receives a signal from the signal line 124a.

In step S258, 0.90 is transmitted to the signal line 142h to set the reduction ratio of the reduction circuit 134 in the sub-scanning direction to 90%. In step S260, a signal, the level of which is "0", is transmitted to the signal line 142i so that setting is made in such a manner that the recording circuit 36 does not record data.

In step S262, a discrimination is made whether or not registration of the one touch dial has been selected through the operation portion. If the registration of the one touch dial has been selected, the flow proceeds to step S264 in which information about the number of the one touch dial and information whether or not reduced recording is performed are registered into the registration circuit 140.

If the registration of the one touch dial has not been selected, a discrimination is made in step S266 whether or not registration of the shortened dial has been selected through the operation portion. If the registration of the shortened dial has been selected, the number of the shortened dial and information whether or not reduced recording is performed are registered into the registration circuit 141.

If the registration of the shortened dial has not been selected, a discrimination is made in step S270 whether or not receipt has been selected. If receipt has not been selected, the flow proceeds to step S272 in which other processes are performed.

If receipt has been selected, a signal, the level of which is "1", is transmitted to the signal line 142a in step S274 to activate the CML, and the previous procedures are performed in step S276.

In step S278, a discrimination is made whether or not the TSI signal has been transmitted from the transmitter side apparatus. If the TSI signal has been transmitted from the transmitter side apparatus, the flow proceeds to step S280. If the TSI signal has not been transmitted, the flow proceeds to step S286.

In step S280, checking is made by receiving information from the registration circuits 140 and 141, the checking being made whether or not the lower 6 digits of the TSI signal coincide with the lower 6 digits of the shortened dial. If the lower 6 digits of the TSI signal coincide with the lower 6 digits of the one touch dial or the shortened dial, the flow proceeds to step S282. If they do not coincide with each other, the flow proceeds to step S286.

In step S282, information items in the registration circuits 140 and 141 are received to discriminate whether or not registration of reduced recording has been made in the coincident one touch dial or the shortened dial or registration of same magnification recording has been made in the same. If reduced recording has been registered, the flow proceeds to step S284. If same magnification recording has been registered, the flow proceeds to step S286.

In step S284, a signal, the level of which is "2", is transmitted to the signal line 142i so that setting is made in such a manner that the recording circuit 136 receives reduced data (data on the signal line 134a).

In step S286, a signal, the level of which is "1", is transmitted to the signal line 142i so that setting is made in such a manner that the recording circuit 136 receives the same magnification data (data on the signal line 132).

In step S288, the residual portion of the residual procedures are performed. In step S290, a discrimination is made whether or not G3-mode communication has been selected. If the G3-mode communication has been selected, the flow proceeds to step S292. If the ECM mode communication has been selected, the flow proceeds to step S304.

In step S292, receipt and recording of an image signal are performed. In step S294, a discrimination is made whether or not receiving and recording of one page has been completed. If receiving and recording of one page has been completed, the flow proceeds to step S296 in which intermediate procedures are performed. In step S298, a discrimination is made whether or not the next page is present. If the next page is present, the flow proceeds to step S300. If no next page is present, the flow proceeds to step S302.

In step S300, residual intermediate procedures are performed, and the flow returns to step S92. In step S302, post-procedures are performed, and the flow returns to step S252.

In step S304, a signal, the level of which is "1", is transmitted to the signal line 142g to make setting in such a manner that the decoding circuit 132 receives the signal from the signal line 130a. In step S306, data in the HDLC format is received through the signal lines 142e and 128b. Further, data transmitted to the signal line 128a is stored in the memory circuit 130 through the signal line 142f.

In step S308, data stored in the memory circuit 130 is transmitted to the signal line 130a through the signal line 142f if information for one page has been stored in the memory circuit 130. After data has been decoded, data is recorded.

In step S310, a discrimination is made whether or not receipt of one page has been completed. If data for one page has been received, the flow proceeds to step S312. If data for one page has not been completed, the flow returns to step S306.

In step S312, intermediate procedures are performed. In step S314, a discrimination is made whether or not a next page is present. If the next page is present, residual intermediate procedures are performed in step S318, and the flow returns to step S306. If no next page is present, residual post-procedures are performed, and the flow returns to step S252.

It should be noted that the second embodiment is arranged in such a manner that same magnification recording is performed in a case where the TSI signal has not been transmitted from the transmitter side apparatus or the lower 6 digits of the transmitted TSI signal have not been registered in the one touch dial or the shortened dial.

However, reduced recording at a reduction ratio of 90% may be performed in the foregoing case. Specifically, in the case where a negative discrimination has been made in step S278 or a negative discrimination has been made in step S280, the flow does not proceed to step S286. In the foregoing cases, the flow proceeds to step S284. The arrangement that whether or not same magnification recording is performed or whether or not reduced recording is performed in accordance with the foregoing two conditions may be determined in accordance with another combination.

Further, a registration means may be disposed in the facsimile apparatus to select reduced recording at a reduction ratio of 90% or same magnification recording, and same magnification recording or reduced recording may be performed in accordance with the contents registered in the registration means.

Similarly, a registration means for selecting reduced recording at a reduction ratio of 90% or same magnification recording may be disposed. In only a case where the TSI signal has not been transmitted from the transmitter side apparatus or in only a case where the lower 6 digits of the transmitted TSI signal have not been registered in the one touch dial or the shortened dial, recording is performed in accordance with the contents registered in the registration means that the reduced recording at a reduction ratio of 90% or the same magnification recording is performed. If the lower 6 digits of the transmitted TSI signal have been registered in the one touch dial or the shortened dial, recording is performed in accordance with registered information.

Although the second embodiment is arranged in such a manner that recording is performed in accordance with information indicating the same magnification recording or reduced recording registered in the one touch dial or the shortened dial or the facsimile apparatus, another arrangement may be employed. Specifically, the sub-scanning directional length of received information is automatically detected, a fact that same magnification recording or reduced recording is performed is automatically registered to correspond to the transmitter side apparatus, and the registration is changed.

The foregoing arrangement will now be described. When receipt has been selected and the transmitter side stores a reduction ratio, data is recorded at the foregoing reduction ratio. If the transmitter side does not store a reduction ratio, same magnification recording is performed. If a discrimination has been made during the same magnification recording that all received information items are divided into two pages and also the same can be included within one page by reducing the same to 90% or more, an instruction is automatically registered in the registration circuit 140 or 141 to record next transmitted information from the transmitter side apparatus at a reduction ratio with which transmitted information can be included within one page.

Figure 10:
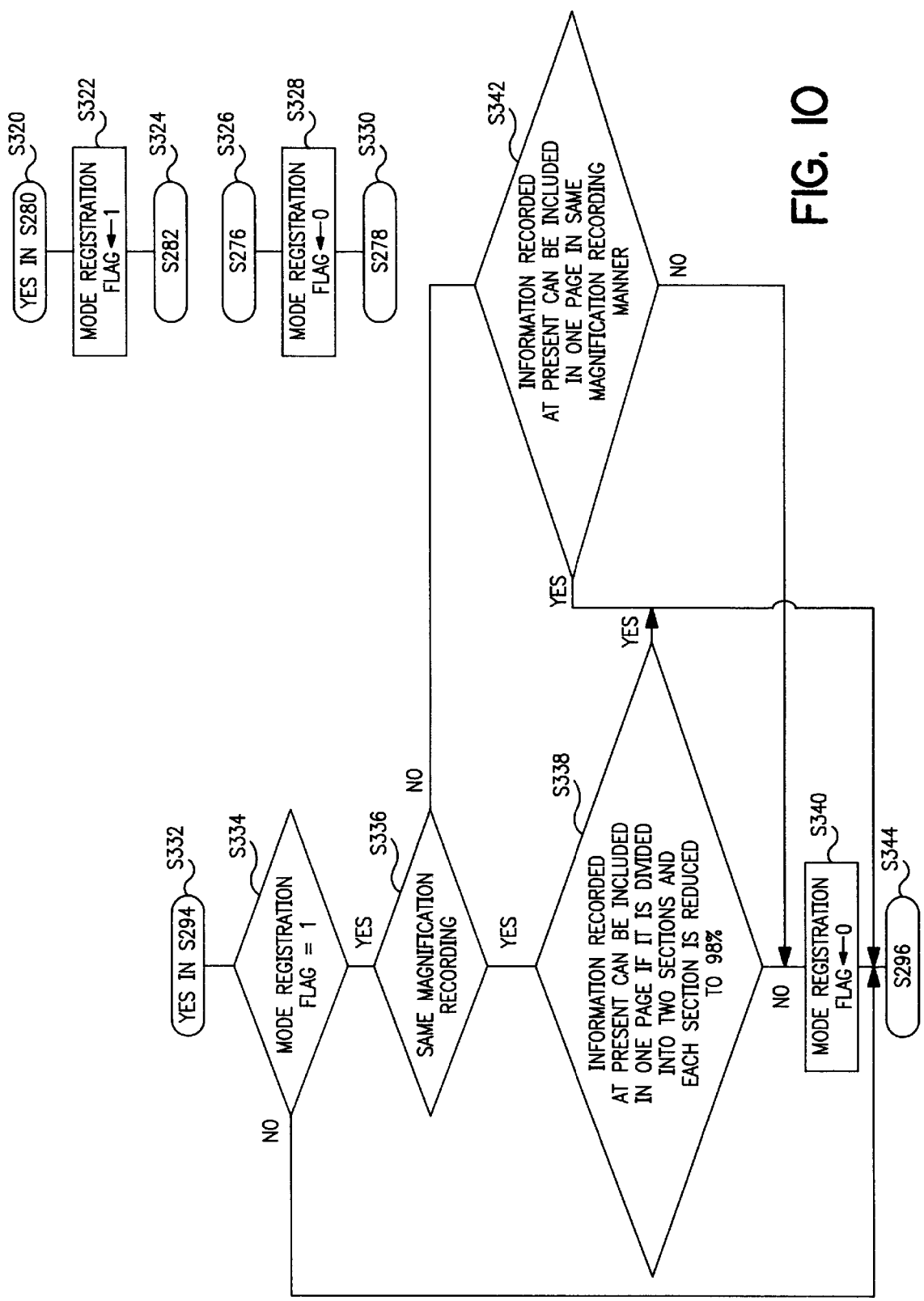
FIG. 10 is a flow chart which illustrates the operation of a modification of the second embodiment.
Figure 11:
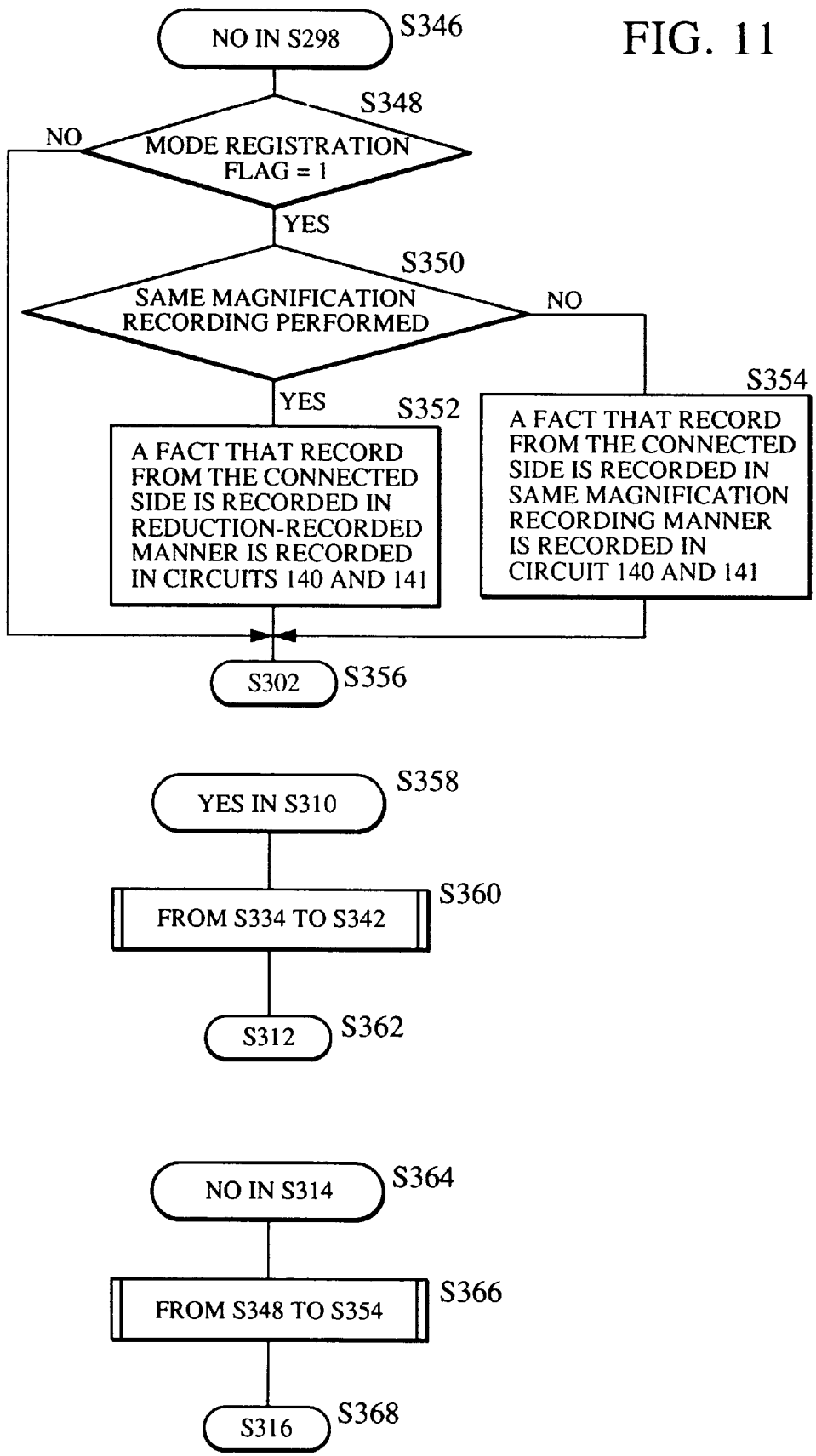
FIG. 11 is a flow which illustrates the operation of a modification of the second embodiment.

FIGS. 10 and 11 illustrate a flow chart which shows control to be performed in the aforesaid case and different from those shown in FIGS. 7 to 9.

Referring to FIGS. 10 and 11, step S320 corresponds to the affirmative discrimination in step S280. In step S322, 1 is set to a mode registration flag 1, and flow proceeds to step S324 (step S282 in the foregoing case).

Step S326 corresponds to step S276 in the foregoing flow chart. In step S328, 0 is set to the mode registration flag, and flow proceeds to step S330 (step S278 in the foregoing flow chart).

Step S332 corresponds to the affirmative discrimination in step S294 in the foregoing flow chart. In step S334, a discrimination is made whether or not the mode registration flag is 1. If the same is 1, the flow proceeds to step S336. If the same is 0, the flow proceeds to step S344.

In step S336, a discrimination is made whether or not same magnification recording is being performed. If same magnification recording is being performed, the flow proceeds to step S338. If reduced recording is being performed, the flow proceeds to step S342.

In step S338, a discrimination is made whether or not recorded information at present is divided into two pages and whether it can be included within one page by reducing data to 90%. If it can be included within one page, the flow proceeds to step S344 (step S296 in the foregoing flow chart). If it cannot be included within one page, the flow returns to step S340.

In step S340, 0 is set to the mode registration flag. In step S342, a discrimination is made whether or not information recorded at present can be included in one page even if same magnification recording is performed. If it can be included in one page, the flow proceeds to step S344 (the foregoing step S296). If it cannot be included, the flow returns to step S340.

Step S346 corresponds to the negative case in step S298 in the foregoing flow chart. In step S348, a discrimination is made whether or not the mode registration flat is 1. If it is 1, the flow proceeds to step S350. If it is 0, the flow proceeds to step S356 (step S302 in the foregoing flow chart).

In step S350, a discrimination is made whether or not same magnification recording is being performed. If same magnification recording is being performed, the flow proceeds to step S352. If same magnification recording is being performed, the flow proceeds to step S354.

In step S352, a fact is registered into the registration circuit 140 or 141 that transmitted information is reduced-recorded, and the flow proceeds to step S356 (step S302 in the foregoing flow chart). In step S354, a fact that transmitted information is recorded at the same magnification is registered into the registration circuit 140 or 141, and the flow proceeds to step S356 (step S302 in the foregoing flow chart).

Step S358 corresponds to the negative case in step S314. In next step S366, processes from step S348 to S354 are performed, and, in step S368, the flow proceeds to step S316 in the foregoing flow chart.

Step S364 corresponds to the negative discrimination in step S314. In next step S366, processes from steps S348 to S354 are performed. In step S368, the flow proceeds to step S316.

In the foregoing operation, registration is set such that ensuing communications are performed by reduced recording if all received information items are divided into two pages at the time of performing same magnification recording and as well they can be included within one page by reducing data to 90%. A registration is set such that reduced recording is performed in a case where all received information can be included within one page at the same magnification at the time of performing reduced recording and the same magnification recording has been registered. In this case, same magnification recording is performed if reduced recording has been registered. The arrangement is made such that the foregoing operation is performed if all information items in one communication meet the conditions. However, the registration of same magnification recording and reduced recording may be changed if the foregoing conditions are satisfied continuously through several communications.

In the second embodiment, only one reduction ratio of 90% is employed. However, another reduction ratio may be employed, and the reduction ratio may be changed to correspond to the transmitter sides. In this case, a predetermined reduction ratio may be selected from a plurality of reduction ratios.

In the foregoing embodiments, consideration is made about an arrangement that data is recorded at the same magnification or reduced or the reduction ratio is registered correspondingly to the one touch dial or the shortened dial. However, at the transmitter side, the data from which is recorded at the reduction ratio, may be stored.

Although the reduction according to the second embodiment is considered for reduction in only the sub-scanning direction, data may be reduced in both the main scanning direction and the sub-scanning direction. Although the second embodiment has considered the reduction ratio determined in dependence on the length in the main scanning direction of received data and on the number of received data lines, reduction may be performed in such a manner that attention is paid to effective image areas including color information. In the second embodiment, the reduction and same magnification recording are considered, consideration may be made about enlargement recording for fully recording data on the space of a cut sheet.

Although consideration is, in the second embodiment, made about thermal transference to recording paper having a regular size, the arrangement may be adapted to BJ recording or LBP recording (in the LBP mode, discrimination of an error occurring in receipt is performed in a simplified manner).

A third embodiment of the present invention will now be described.

If the length in the main scanning direction of read information is the same as the length of the recording paper in the main scanning direction when transmission of the read information has been selected, all read information items are not reduced but they have been, at the same magnification, transmitted.

However, facsimile apparatuses using cut sheets to perform the LBP recording have been increased recently. Therefore, if information longer than the regular size is transmitted, the process to be performed by the receiver side apparatus becomes too complicated. A portion of the foregoing machines has an arrangement that data is recorded while being divided into two pages or rear end information having a predetermined length is omitted or reduction recording is performed to make information to be included in one page or reduction recording at a sole ratio (for example, 90%) is performed. In a case where reduction is performed, there is reduction in only the sub-scanning direction and in both main scanning direction and the sub-scanning direction.

Therefore, there arises a problem in that the same information items transmitted are undersirably received in a variety of forms. Moreover, if the receiver side apparatus performs recording using regular form paper, the reduction necessarily performed in the receiver side apparatus results in that the time required to complete the transmission is lengthened and, therefore, the communication cost becomes wasteful. However, although the cut sheets have been used widely, there are a multiplicity of facsimile apparatuses using a long-size recording paper, and accordingly companies handling drawings and the like have a need to, in place of transmitting read information in a reduced manner as the regular format paper, transmit data at the same magnification. Further, the regular format paper includes, in its category, various regular format paper sheets, such as A4 size, letter size and legal size with respect to transmitted information having a length of, for example, 216 mm in the main scanning direction.

The third embodiments provides a facsimile apparatus allowing a user to select freely the size of information to be transmitted.

Figure 12:
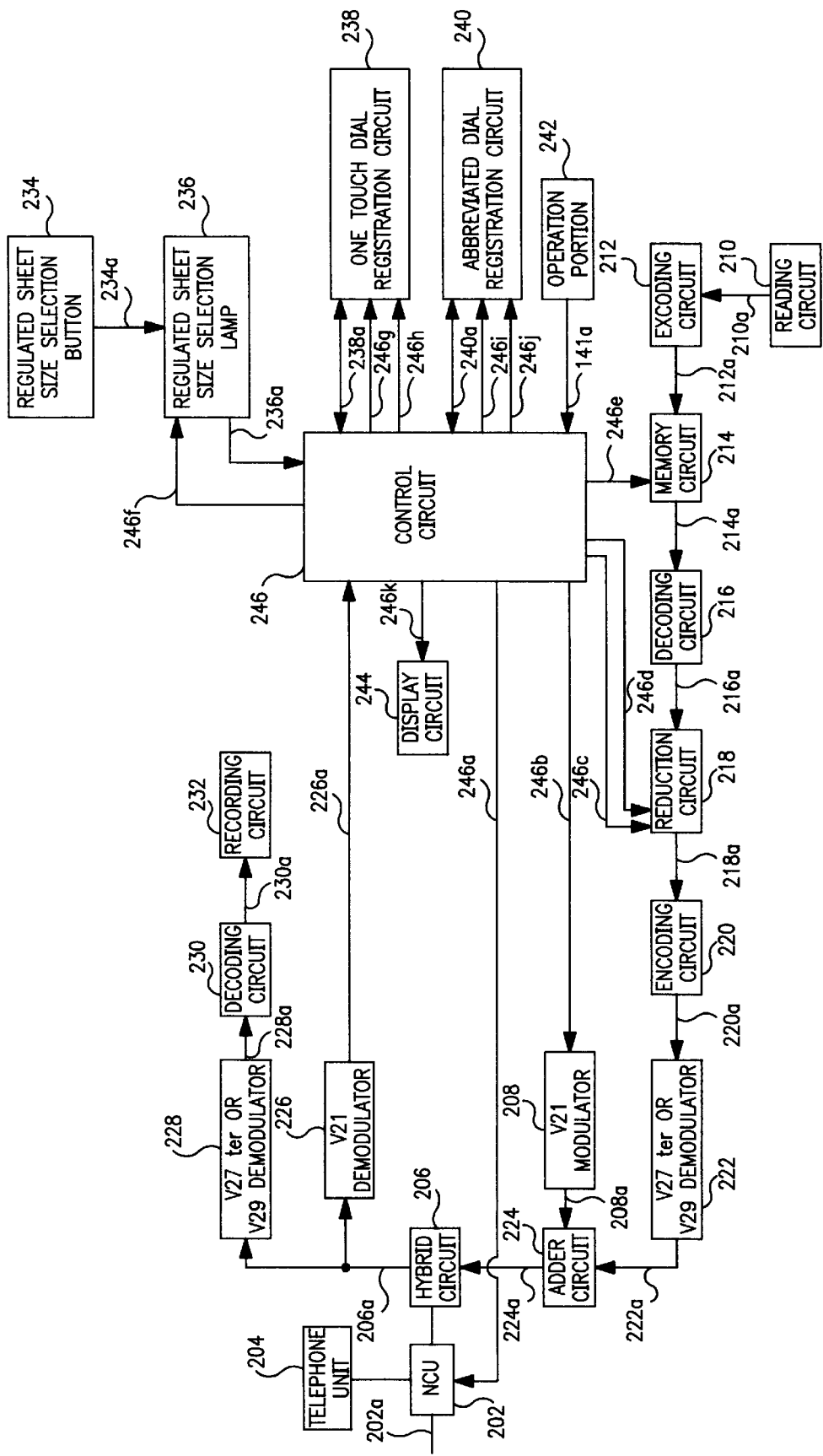
FIG. 12 is a block diagram which illustrates a third embodiment of the present invention.
Figure 13:
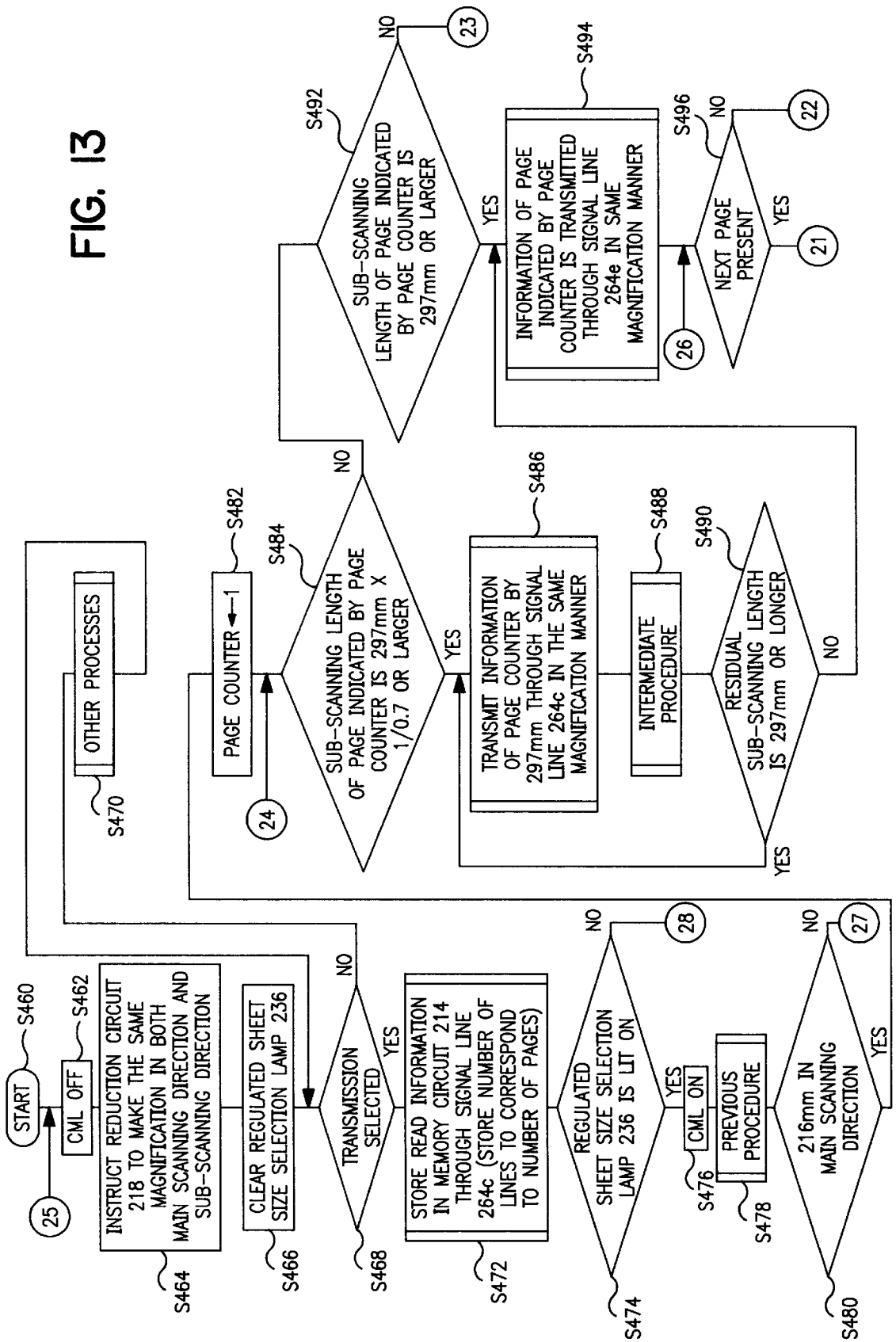
FIG. 13 is a flow chart which illustrates the operation of the third embodiment.
Figure 14:
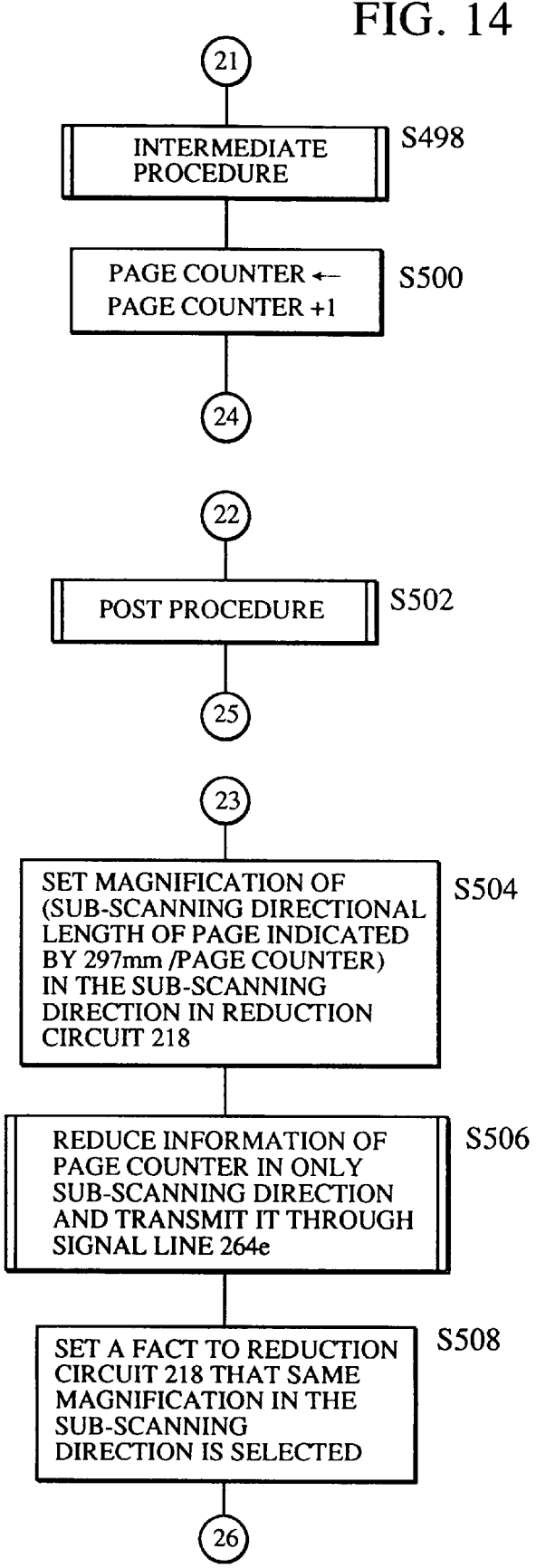
FIG. 14 is two parts of a flow chart which illustrates the operation of the third embodiment.
Figure 15:
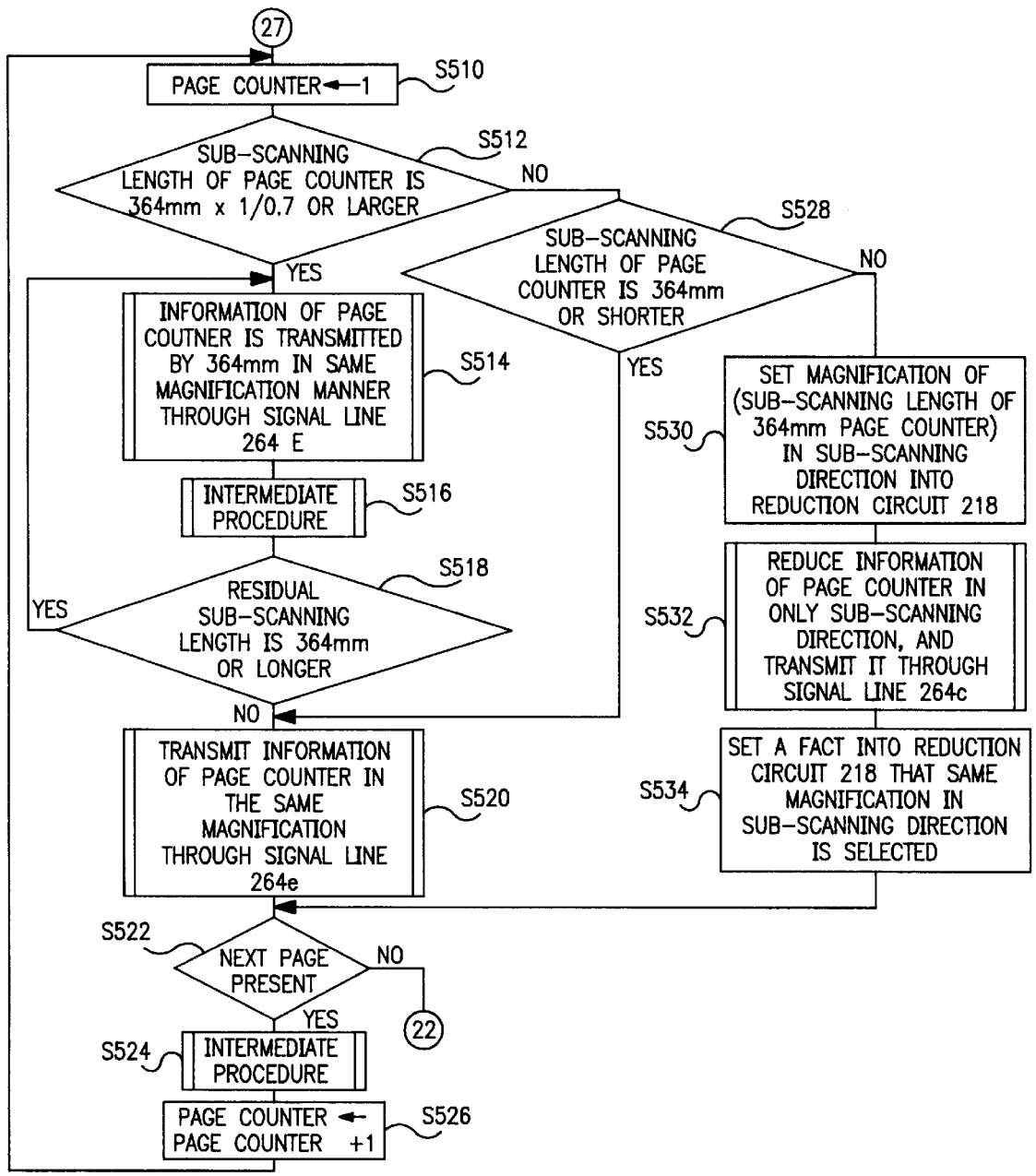
FIG. 15 is a flow chart which illustrates the operation of the third embodiment.
Figure 16:
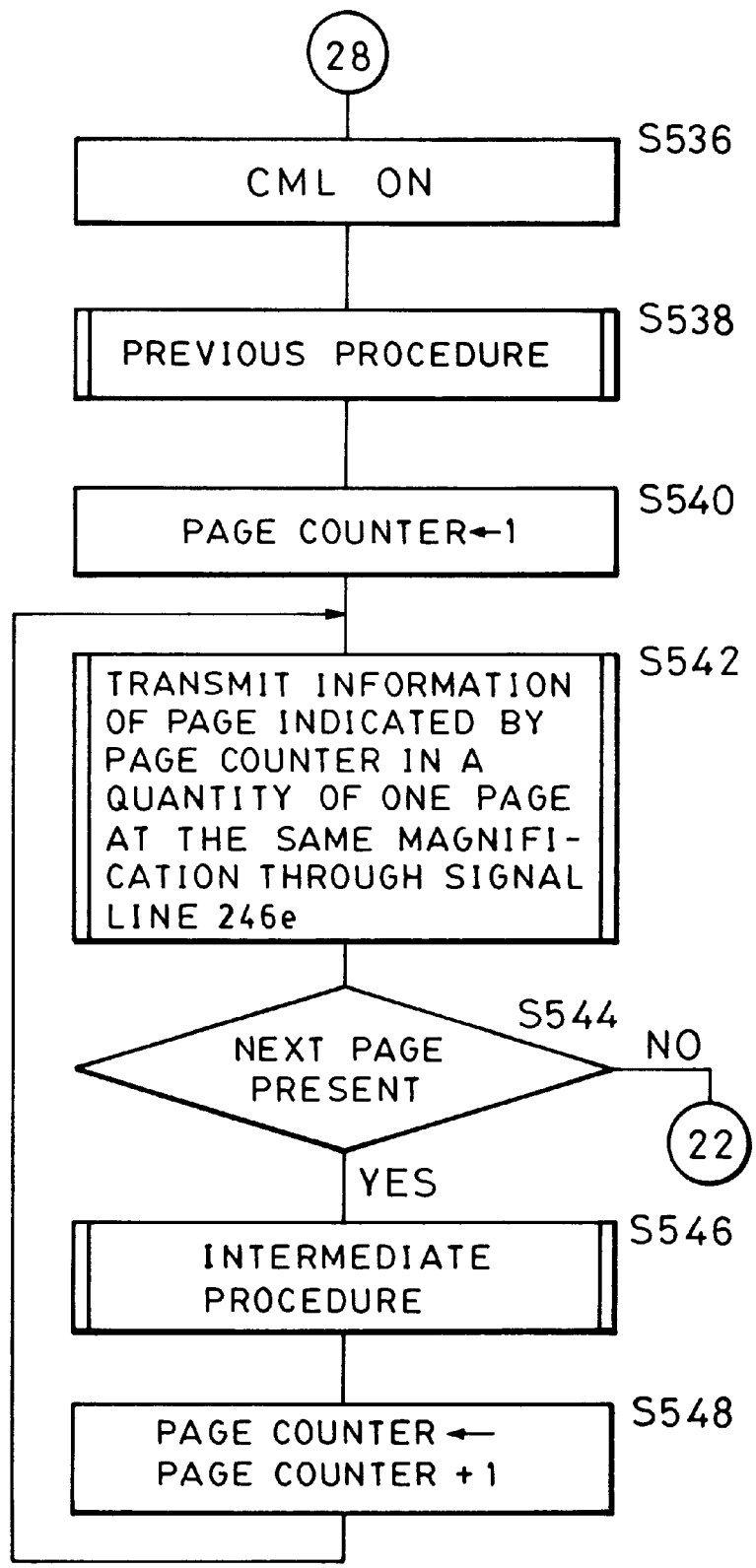
FIG. 16 is a flow chart which illustrates the operation of the third embodiment.

FIG. 12 is a block diagram which illustrates a third embodiment.

An NCU (Network Control Unit) 202 is disposed to use a telephone network to communicate data or the like in such a manner that the NCU 2 is connected to a terminal of the telephone network to control the connection of the telephone network, switch data communication passages and hold a DC loop. The NCU 202 establishes the connection between a telephone line 202a to a telephone set 204 if the level of a signal (on a signal line 246a) supplied from a control circuit 246 is "0". The NCU 2 establishes the connection between the telephone line 202a and a facsimile apparatus if the level of the signal is "1". In a normal state, the telephone circuit 202a is connected to the side including the telephone set 204.

A hybrid circuit 206 separates signals in a transmission system and signals in a receipt system from each other to transmit the signals supplied from an adder circuit 224 to the telephone circuit 202a through the NCU 202. The hybrid circuit 206 receives signals transmitted from the transmitting side through the NCU 202 to transmit the signals to a demodulator 228 and a V21 demodulator 226 through a signal line 206a.

A V21 modulator 208 is a modulator adapted to known CCITT recommendation V21 to modulate a procedure signal (on a signal line 246b) supplied from the control circuit 246 to transmit it to the adder circuit 224 through a signal line 208a.

A reading circuit 212 sequentially reads image signals from a transmitted original document for one line in the main scanning direction to make binary signal trains representing white and black, the reading circuit 212 transmitting data of the binary signal train to an encoding circuit 212 through a signal line 210a. The reading circuit 212 is composed of an image sensing device, such as a CCD (a Charge Coupled Device), and an optical system.

The encoding circuit 212 receives read data transmitted to the signal line 210a to encode (MH-encode or MR-encode) read data, the encoding circuit 212 being arranged to transmit encoded data through a signal line 212a.

The memory circuit 214 is under control performed through a signal line 264e connected to the control circuit 246, stores data transmitted to the signal line 212a and transmits stored data to a decoding circuit 216 through a signal line 214a.

The decoding circuit 216 is a circuit for decoding (MH-decoding or MR-decoding) data supplied through the signal line 214a and transmitting decoded data to a reduction circuit 218 through a signal line 216a.

The reduction circuit 218 is circuit for receiving data from the signal line 216a to transmit run-length data through a signal line 218a at a magnification transmitted to the signal line 246c in the main scanning direction and that at a reduction ratio transmitted to the signal line 246d in the sub-scanning direction.

An encoding circuit 220 receives run-length data transmitted from the signal line 218a to encode it, the encoding circuit 220 being arranged to transmit the data to a modulator 222 through a signal line 220a.

A V27 ter or V29 modulator 222 receives encoded data from the signal line 220a to modulate it o n the basis of known CCITT recommendation V27 ter (differential phase modulation) or V29 (orthogonal modulation), the V27 ter or V29 modulator 222 being arranged to transmit modulated data to the adder circuit 224 through a signal line 222a.

The adder circuit 224 is a circuit for adding outputs from the modulators 208 and 222 to each other. The output from the adder circuit 224 is transmitted to the hybrid circuit 206.

A V21 demodulator 226 demodulates data in accordance with known CCITT recommendation V21. The demodulator 226 receives the procedure signal from the hybrid circuit 206 through the signal line 206a to V21-demodulate it, the V21 demodulator 226 being arranged to transmit demodulated data to the control circuit 246 through a signal line 226a.

A V27 ter or V29 demodulator 228 is arranged to perform demodulation in accordance with known CCITT recommendation V27 ter or V29. The demodulator 228 receives demodulated image signal supplied from the hybrid circuit 206 to demodulate it, the demodulator 228 being arranged to transmit demodulated data to a decoding circuit 230 through a signal line 228a.

A decoding circuit 230 is a circuit for decoding (MH-decoding or MR-decoding) data received from the signal line 228a, the decoding circuit 228 being arranged to transmit data to a recording circuit 232 through a signal line 230a.

The recording circuit is a circuit for receiving data transmitted to the signal line 230a to sequentially record data for each line.

A regular-format-size selection button 234 is a button for use when transmission of the regular format size sheet is selected. When the foregoing button 234 is depressed, a depression pulse is generated in a signal line 234a.

A regular-format-size selection lamp 236 is lit on when a clear pulse has been generated in a signal line 246f and afterwards repeatedly lit on, lit off and lit on whenever the depression pulse is generated in the signal line 234a. When the regular-format-size selection lamp 236 is lit off, it transmits a signal, the level of which is "0", to a signal line 236a. When it is lit on, it transmits a signal, the level of which is "1", to the signal line 236a.

A register circuit 238 is a circuit for registering one touch dial including whether or not the regular format size is transmitted to each connected apparatus. As the shortened dial, 100 stations from 00 to 99 can be registered. When registration into the register circuit 238 is performed, data is output to a signal line 238a in accordance with the following format: one touch dial number (one of numbers from 01 to 36, for example, 01), one space, telephone number (for example, 03-3333-1111) and information whether or not transmission is performed with the regular paper size (0 when transmission is not performed with the regular paper size and 1 when transmission is performed with the regular paper size, in this case, for example, 1 is transmitted). Then, a right pulse is generated on the signal line 246g. When information registered in the registration circuit 238 is read, the one touch dial number (for example, 01) is transmitted to the signal line 238a. Then, a read pulse is generated in the signal line 246h. Thus, in accordance with data registered correspondingly to the one touch dial number (for example, 01), telephone number (for example, 03-3333-1111) and information whether or not transmission is performed with the regular paper size (for example, 1) are transmitted.

A registration circuit 240 is a circuit for registering shortened dial including whether or not the regular format size is transmitted to each connected apparatus. As the shortened dial, 100 stations from 00 to 99 can be registered. When registration into the registration circuit 240 is made, the following information items are transmitted to a signal line 240a: the shortened dial number (one of numbers from 00 to 99, for example, 00), one space, the telephone number (for example, 03-1111-2222) and information whether or not data is transmitted with the regular format paper size (when data is not transmitted with the regular format paper size, 0 and when data is transmitted with the regular format paper size, 1, in this case, for example, 0 is transmitted). Then, a write pulse is generated on a signal line 246$i$. When information registered in the registration circuit 240 is read, the shortened dial number (for example, 00) is transmitted, and then a read pulse is generated on the signal line 246$j$. Thus, in accordance with data registered in the registration circuit 240 correspondingly to the shortened dial number (for example, 00), the telephone number (for example, 03-1111-2222) and information (for example, 0) whether or not data is transmitted with the regular format paper size are transmitted to the signal line 240$a$.

An operation portion 242 has keys, such as one touch dials, shortened dials, a start key, a ten key, a * key and a # key. Information representing depression of the key is transmitted to a signal line 242$a$.

A display portion 244 receives a signal transmitted to a signal line 246$k$ and performs display.

A control circuit 246 performs, in this embodiment, the following control. When information transmission with the regular format paper size has been selected, and if the length in the main scanning direction is 256 mm, regular format information denoting, for example, A4 size is transmitted. If the length in the main scanning direction is 256 mm, regular format information denoting B4 size is transmitted. In this control, the reduction is considered in only the sub-scanning direction. If the reduction ratio is lower than a predetermined ratio, division to a plurality of pages is performed in order to transmit data with the same magnification. That is, data in a quantity of lines which serve as information of the regular format paper is transmitted, and then residual information is, as the next page, transmitted. If transmission of information as the regular format paper size has not been selected, information is transmitted at the same magnification.

FIGS. 13 to 16 are flow charts which illustrate the operation of the third embodiment.

In step S462, a signal, the level of which is "0", is transmitted to the signal line 246$a$ so as to deactivate the CML. In step S464, 1 is transmitted to both signal line 246$c$ and the signal line 246$d$ so as to instruct the reduction circuit 218 that the same magnification is made in both main scanning direction and the sub-scanning direction. In step S466, a clear pulse is generated in the signal line 246$f$ so that the regular format paper size selection lamp 236 is lit off.

Then, in step S468, whether or not transmission has been selected is discriminated. If the transmission has not been selected, the flow proceeds to step S470 in which other processes are performed.

If the transmission has been selected, the flow proceeds to step S472 so that read information is stored in the memory circuit 214 through the signal line 264$e$ as the number of lines are stored correspondingly to the number of pages. In this embodiment, information stored in the memory circuit 214 is transmitted at the same magnification.

In step S474, a signal on the signal line 236$a$ is received in order to discriminate whether or not the regular format paper size selection lamp 236 has been lit on, that is, whether or not transmission of information having the regular format paper size has been selected. If the regular format paper size selection lamp 236 has been lit on, that is, if the transmission of information having the regular format paper size has been selected, the flow proceeds to step S476. If the regular format paper size selection lamp 236 has been lit off, that is, if the transmission of information having the regular format paper size has not been selected, the flow proceeds to step S536.

In step S476, a signal, the level of which is "1", is transmitted to the signal line 246$a$ in order to activate the CML. In step S478, previous procedures are performed.

In step S480, whether or not the length in the main scanning direction is 216 mm is discriminated. If it is 216 mm, the flow proceeds to step S482. If it is not 216 mm, the flow proceeds to step S510.

In step S482, 1 is set into the page counter. In step S484, whether or not the length in the sub-scanning direction of page information stored in the memory circuit 214 correspondingly to the page counter is larger than 297×1/0.7 mm is discriminated. If the length is 297×1/0.7 mm or larger, the flow proceeds to step S486. That is, in this case, reduction to 70% is performed in the sub-scanning direction, the regular format paper size is not formed. If the size is not 297×1/0.7 mm or larger, the flow proceeds to step S492.

In step S486, information of the page counter is transmitted from the memory circuit 214 through the signal line 264$e$. Data is transmitted by 297 mm in the sub-scanning direction with the same magnification. In step S488, intermediate procedures are performed.

In step S490, whether or not the length of residual information of the page counter stored in the memory circuit 214 is longer than 297 mm is discriminated. If the length is 297 mm or longer, the flow proceeds to step S490. If the length is shorter than 297 mm, the flow proceeds to step S494.

In step S492, whether or not the sub-scanning directional length of page information stored in the memory circuit 214 correspondingly to the page counter is 297 mm or shorter is discriminated. If the length is 297 mm or shorter, the flow proceeds to step S494. If the length exceeds 297 mm, the flow proceeds to step S504.

In step S494, image information of the page indicated by the page counter is, through the signal line 264$e$, transmitted from the memory circuit 214, the image information being transmitted at the same magnification. In step S496, whether or not the next page is present is discriminated. If the next page is present, the flow proceeds to step S498 so that intermediate procedures are performed. In step S500, the count of the page counter is increased, and the flow returns to step S484. If no next page is present, the flow proceeds to step S502 so that post-procedures are performed, and then the flow returns to step S462.

In step S504, a value (of 297 mm which is the sub-scanning directional length of the page counter stored in the memory circuit 214) is transmitted so that the reduction ratio in the sub-scanning direction is set to the reduction circuit 218. Then, in step S506, information of the page counter is transmitted from the memory circuit 214 through the signal line 246$e$ so that information is reduced in only the sub-scanning direction as compared with setting made in step S504 so as to transmit the reduced data. In step S508, 1 is transmitted to the signal line 246$d$ so that the same magnification in the sub-scanning direction is set in the reduction circuit 218, and the flow returns to step S496.

In step S510, 1 is set to the page counter. In step S512, whether or not the sub-scanning directional length of page information stored in the memory circuit 214 correspondingly to the page counter is 364×1/0.7 mm or larger is discriminated. If the length is 364×1/0.7 mm or longer, the flow proceeds to step S514. That is, in this case, reduction in the sub-scanning direction to 70% does not result in the regular format paper size. If the length is not 364×1/07 mm or longer, the flow proceeds to step S528.

In step S514, information of the page counter is, through the signal line 246, transmitted from the memory circuit 214 at the same magnification in a quantity of 364 mm in the sub-scanning direction. In step S516, intermediate procedures are performed.

In step S518, whether or not the length of residual information of the page counter stored in the memory circuit 214 is longer than 364 mm is discriminated. If the length is 364 mm or longer, the flow proceeds to step S514. If the length is shorter than 364 mm, the flow proceeds to step S520.

In step S520, information of the page counter is, through the signal line 264e, transmitted from the memory circuit 214, the image information being transmitted at the same magnification. In step S522, whether or not the next page is present is discriminated. If the next page is present, the flow proceeds to step S524 so that intermediate procedures are performed. In step S526, the count of the page counter is increased, and the flow returns to step S510.

If no next page is present in step S522, the flow proceeds to step S502 so that post-procedures are performed, and then the flow returns to step S462.

In step S528, whether or not the sub-scanning directional length of page information stored in the memory circuit 214 correspondingly to the page counter is 364 mm or longer is discriminated. If the length is 364 mm or shorter, the flow proceeds to step S520. If the same exceeds 364 mm, the flow proceeds to step S530.

In step S530, a value (of 364 mm which is the sub-scanning directional length of the page indicated by the page counter stored in the memory circuit 214) is transmitted so that the reduction ratio in the sub-scanning direction is set to the reduction circuit 218. Then, in step S532, information of the page counter is transmitted from the memory circuit 214 through the signal line 246e so that information is reduced in only the sub-scanning direction as compared with setting made in step S530 so as to transmit the reduced data. Then, in step S534, 1 is transmitted to the signal line 246d so that the same magnification in the sub-scanning direction is set in the reduction circuit 218, and the flow proceeds to step S522.

In step S536, a signal, the level of which is "1", is transmitted so as to activate the CML. In step S538, the previous procedures are performed. In step S540, 1 is set into the page counter. In step S542, information of the page counter is, through the signal line 246e, transmitted from the memory circuit 214 so that information is, at the same magnification, transmitted in a quantity of one page.

Then, in step S544, whether or not the next page is present is discriminated. If the next page is present, the flow proceeds to step S546 so that intermediate procedures are performed. In step S548, the count of the page counter is increased, and the flow returns to step S542. If not page is present in step S544, the flow proceeds to step S502.

Although the foregoing third embodiment has been described about a case where A4 size is transmitted as the regular format paper size transmission if the length in the main scanning direction is 216 mm, the letter size may be considered as the regular format paper size.

In this case, in the control in FIGS. 13 to 16, 297 mm in steps S484, S486, S490, S492 and S504 may be considered as 279 mm.

As the regular format paper size, the legal size may be considered. In this case, in the control in FIGS. 13 to 16, 297 mm in steps S484, S486, S490, S492 and S504 may be considered as 356 mm.

Figure 17:
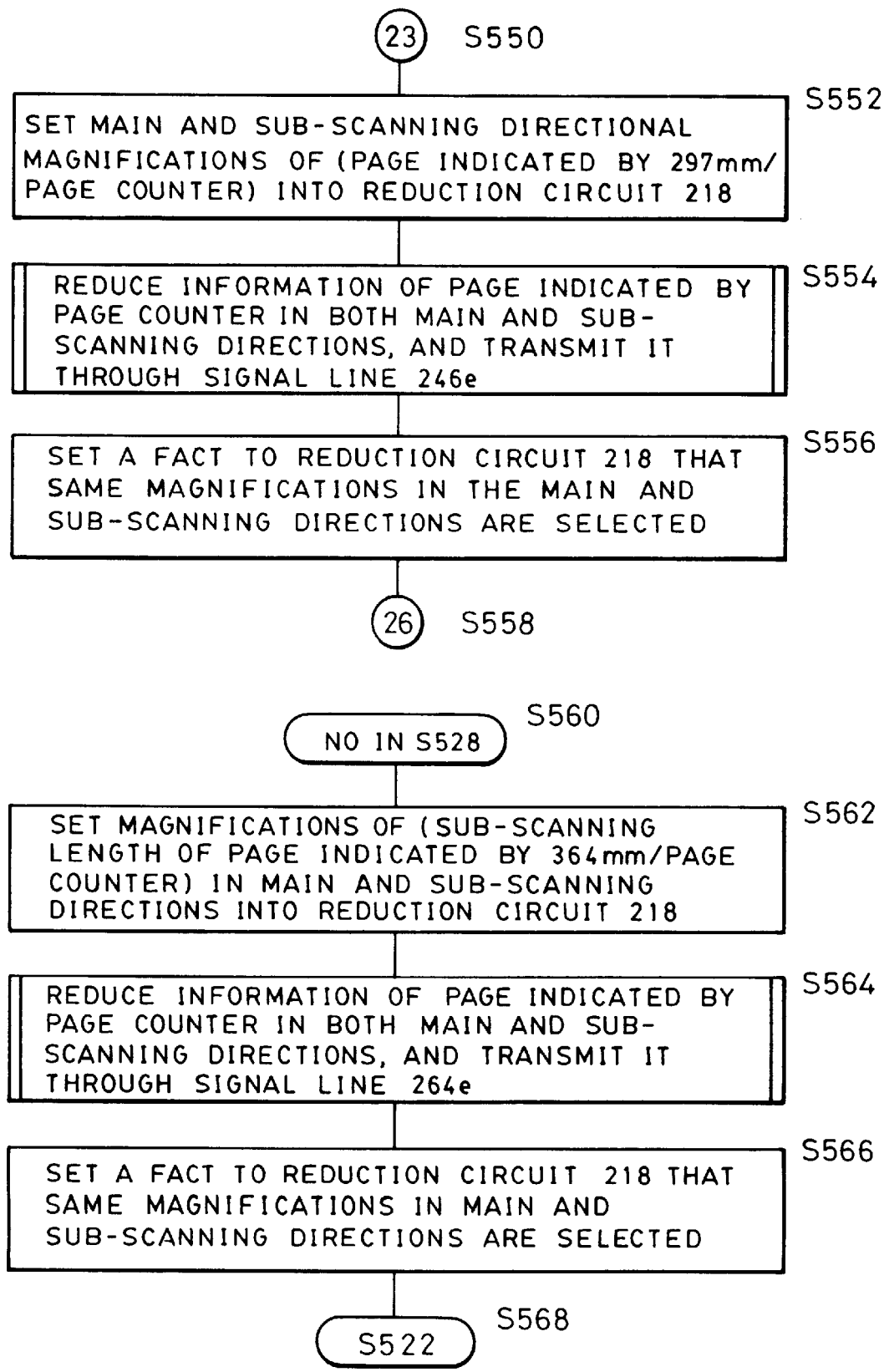
FIG. 17 is two parts of a flow chart which illustrates the operation of a first modification of the third embodiment.

In the foregoing third embodiment, reduction in only the sub-scanning direction is considered. However, the main scanning direction may employ the same magnification as that in the sub-scanning direction. FIG. 17 illustrates only different portions of the foregoing control from those shown in FIGS. 13 to 16.

Referring to FIG. 17, step S550 corresponds to negative discrimination made in step S492. In step S552, a value (of 297 mm which is the sub-scanning directional length of the page counter stored in the memory circuit) is transmitted so that the reduction ratios in main scanning direction and in the sub-scanning direction are set to the reduction circuit 218.

Then, in step S554, information of the page indicated by the page counter is, through the signal line 246e, transmitted from the memory circuit 218 so that data is reduced as the same reduction ratio in both main scanning direction and the sub-scanning direction in accordance with setting made in step S552 so that transmission is performed. In step S556, 1 is transmitted to signal lines 246c and 246d so that the reduction circuit 218 is set to employ the same magnification in both main scanning direction and the sub-scanning direction. In step S558, the flow proceeds to the foregoing step S496.

Step S560 corresponds to the negative discrimination made in the foregoing step S528. In step S562, a value (of 364 mm which is the sub-scanning directional length of the page counter stored in the memory circuit) is transmitted to signal lines 246c and 246d so that the reduction ratio in the main scanning direction and the sub-scanning direction are set in the reduction circuit 218.

Then, in step S564, information of the page counter is, through the signal line 264e, transmitted from the memory circuit 214 so that reduction at the same reduction ratio in both main scanning direction and the sub-scanning direction is performed in accordance with setting made in step S562 and it is transmitted.

In step S566, 1 is transmitted to signal lines 246c and 246d so that the reduction circuit 218 is set to the same magnification in both main scanning direction and the sub-scanning direction. In step S568, the flow is shifted to the foregoing step S522.

If the regular format paper size transmission has been selected and if the sub-scanning directional length of read information stored in the memory circuit 214 is longer than the length in the sub-scanning direction of the regular format paper size by a quantity within a predetermined length (for example, 6 mm), rear end information may be omitted so as to transmit data at the same magnification.

Although the example shown in FIG. 17 is made to reduce the main scanning direction at the same reduction ratio in the sub-scanning direction if transmission of the regular format paper size has been selected, the main scanning direction and the sub-scanning direction may be reduced or enlarged at individual reduction ratios.

As an alternative to making the determination while paying attention to the size of read information, an effective area (the effective length in the main scanning direction is the length from the right end black dot to the left end black dot and that in the sub-scanning direction is the length from the lowermost black dot to the uppermost black dot) in read information may be employed.

In the third embodiment, the selection whether or not the transmission is performed with the regular format paper size is discriminated at each communication in dependence on whether or not the regular format paper size selection lamp 236 is lit on. However, there is sometimes a desire to receive data at the same magnification because the connected station uses a paper roll or the receiver side is a design studio or the like. In order to cope with the desire, information whether or not transmission is performed with the regular format paper size may be registered correspondingly to the registered one touch dials and the shortened dials and transmission may be performed in accordance with the foregoing information.

Figure 18:
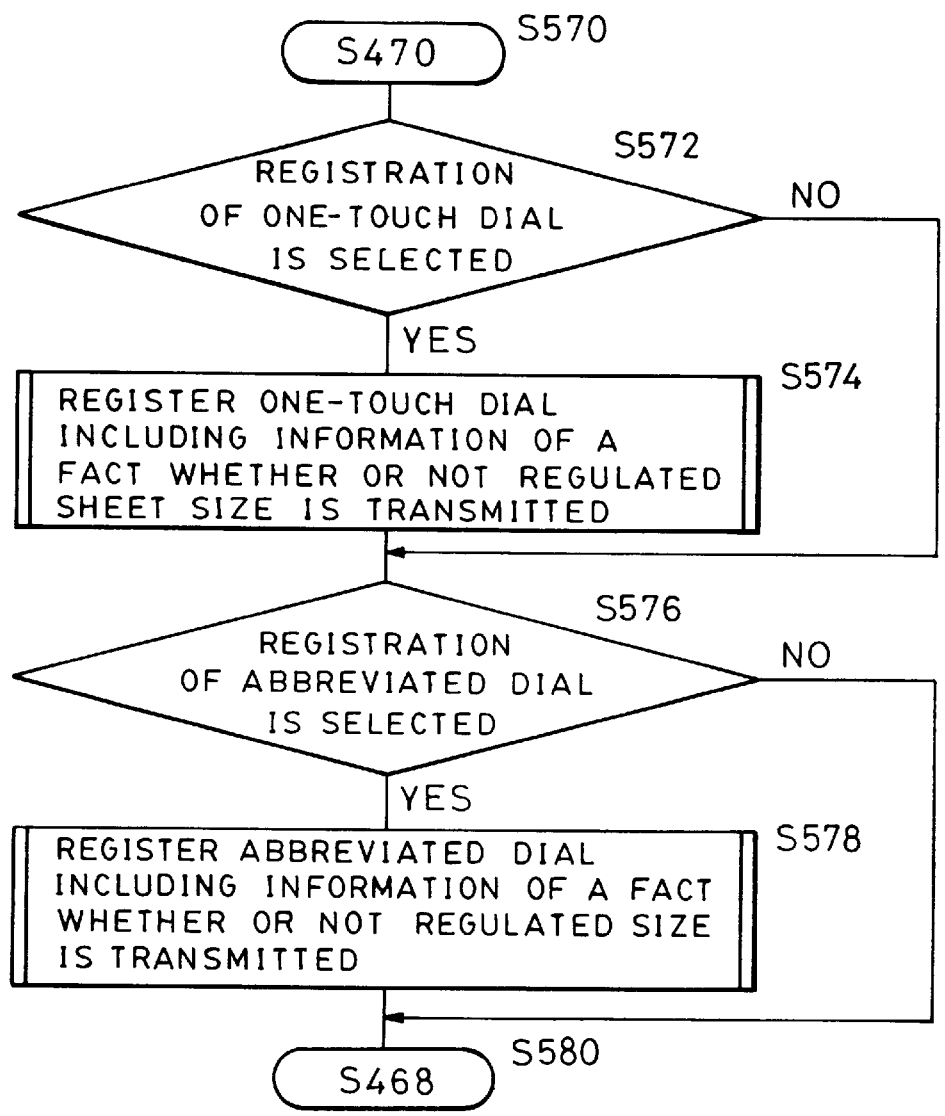
FIG. 18 is two parts of a flow chart which illustrates the operation of a second modification of the third embodiment.
Figure 18:
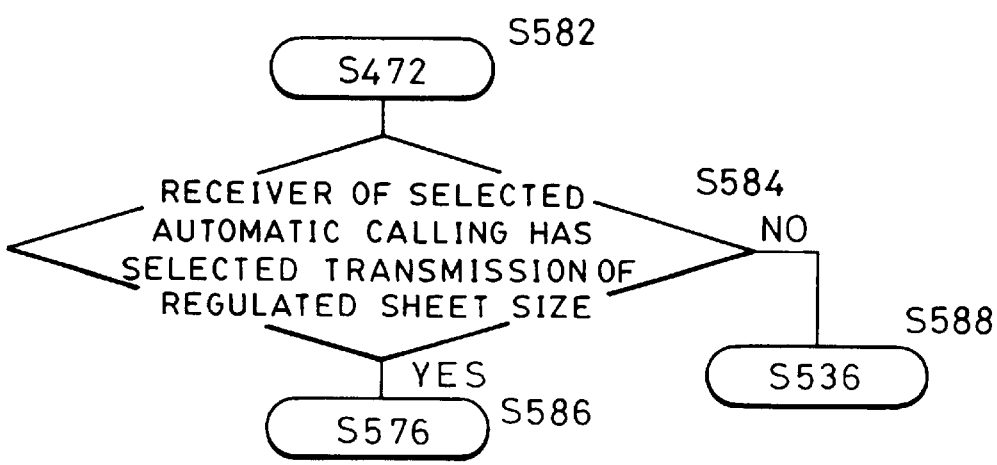

FIG. 18 illustrates only portions of the foregoing operation that are different from those shown in FIGS. 13 to 16.

First, step S570 corresponds to the foregoing step S470. In step S572, information from the operation portion 242 is received so that whether or not registration of the one touch dial has been selected is discriminated. If it has been selected, the flow proceeds to step S574 so that registration of the one touch dial including information whether or not transmission is performed with the regular format paper size is registered.

If the registration of the one touch dial has not been selected, information from the operation portion 242 is, in step S576, received so as to whether or not the registration of the shortened dial has been selected is discriminated. If it has been selected, the flow proceeds to step S578 so that the shortened dial including information whether or not transmission is performed with the regular format paper size is registered. If the registration of the shortened dial has not been selected, the flow proceeds to step S580 (the foregoing step S468).

Step S582 corresponds to the foregoing step S472. In step S584, whether or not the transmission with the regular format paper size of the selected connected side of automatic dialing has been registered correspondingly to the connected side of automatic dialing is discriminated. If the transmission with the regular format paper size has not been registered, the flow proceeds to step S588 (the foregoing step S536). In this structure, transmission selection in the foregoing step S468 is made by depressing the one touch dial or the shortened dial.

In the third embodiment, instruction whether or not the transmission with the regular format paper size is selected is considered. However, as the regular format paper having the main scanning directional length of 216 mm, there are A4 size (210 mm×297 mm), letter size (216 mm×279 mm) and legal size (216 mm×256 mm). Therefore, transmission of selected type of the regular format paper size may be enabled.

Figure 19:
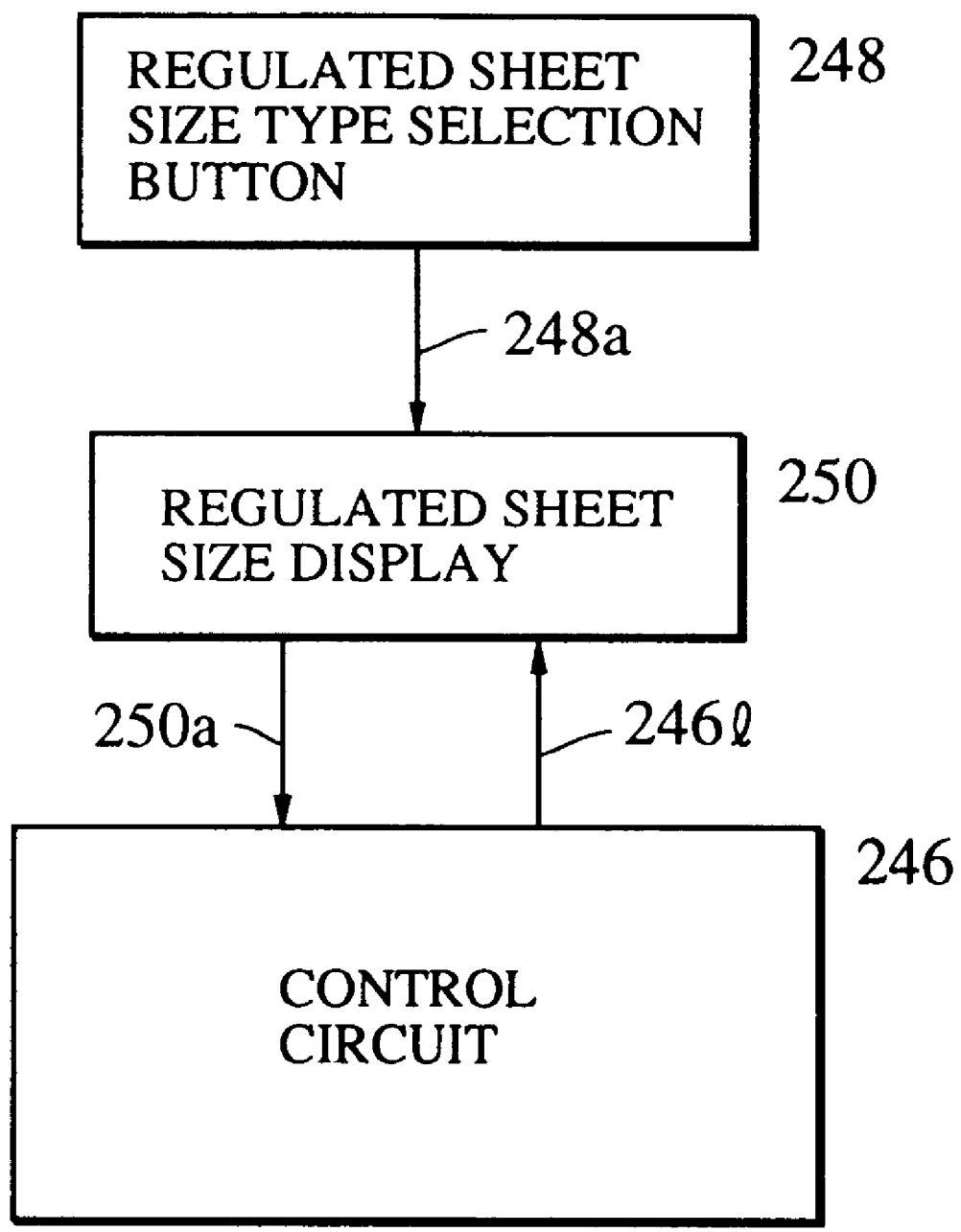
FIG. 19 is a block diagram which illustrates a portion of the structure of a third modification of the third embodiment.

FIG. 19 is a block diagram which illustrates the structure having the function capable of selecting the regular format paper size added thereto. FIG. 19 illustrates a structure that the regular format paper size selection button 234 and the regular format paper size selection lap 236 shown in FIG. 12 are replaced by a regular format paper size type selection button 248 and a regular format paper size display 250. The residual portions are made similarly to the structure shown in FIG. 12.

The regular format paper size type selection button 248 is a button which is depressed when the type of the regular format paper size to be transmitted is selected. When the button 248 is depressed, a depression pulse is generated on the signal line 248a.

The display 250 displays the type of the regular format paper size to be transmitted, the display 250 displaying "No Instruction" if a clear pulse has been generated on the signal line 246r. Then, whenever the depression pulse has been generated on the signal line 248a, the display 250 sequentially displays "A4", "Letter", "Legal", "B4" and "No Instruction". The regular format paper size display 250 transmits, to the signal line 250a, a signal the level of which is "0" when it displays "No Instruction". It transmits, to the signal line 250a, a signal the level of which is "1" when it displays "A4". It transmits, to the signal line 250a, a signal the level of which is "2" when it displays "Letter". It transmits, to the signal line 250a, a signal the level of which is "3" when it displays "Legal". It transmits, to the signal line 250a, a signal, the level of which is "4", when it displays "B4".

Figure 20:
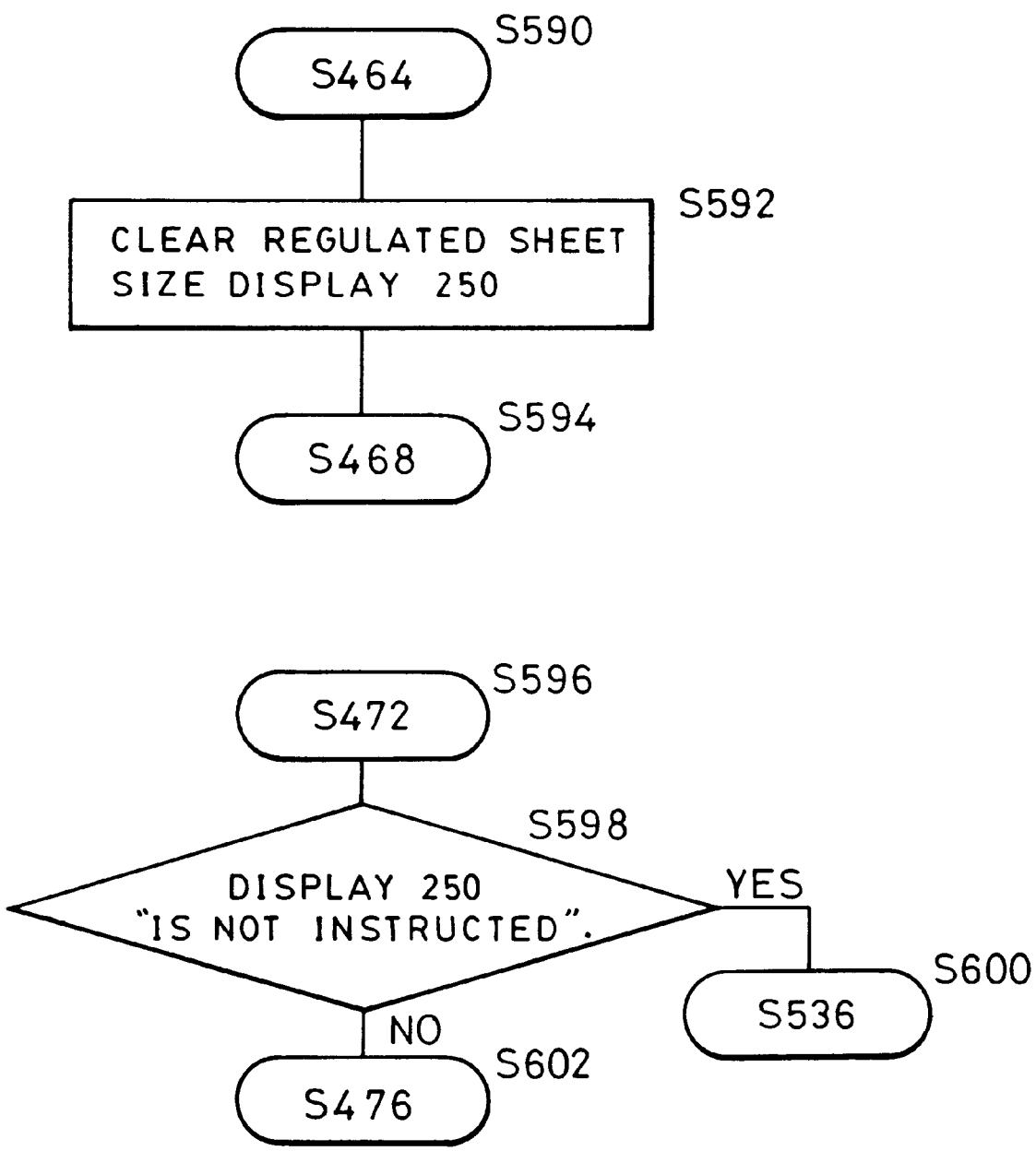
FIG. 20 is two parts of a flow chart which illustrates the operation of the third modification of the third embodiment.

FIG. 20 illustrates portions of control to be performed in the aforesaid case that are different from those shown in FIGS. 13 to 16.

First, step S590 corresponds to the foregoing step S464. In next step S592, a clear pulse is generated on the signal line 246r to clear the regular format paper size display 250, and the flow proceeds to step S594 (the foregoing step S468).

Step S596 corresponds to the foregoing step S472. In next step S598, a signal of the signal line 250a is received so as to discriminate whether or not the regular format paper size display 250 displays "No Instruction". If it displays "No Instruction", the flow proceeds to step S600 (the foregoing step S536). If "No Instruction" is not displayed, the flow proceeds to step S602 (the foregoing step S476).

If the A4 size has been instructed, the size is made intact. If the letter size has been instructed, 297 mm in steps S484, S486, S490, S492 and S504 is made to be 279 mm. If the legal size has been instructed, 297 mm in steps S484, S486, S490, S492 and S504 is made to be 356 mm.

The structure shown in FIG. 20 may be modified in such a manner that the types of the regular format paper sizes of image data to be transmitted are registered in the one touch dial and the shortened dial, and that, when transmission has been selected by depressing the one touch dial or the shortened dial, the transmission is performed in accordance with the type of the regular format paper size registered in the dial.

The structure shown in FIG. 20 may be arranged in such a manner that the regular format paper sizes are registered to be transmitted individually in accordance with the size in the main scanning direction of each original document. If the length in the main scanning direction is, for example, 256 mm, the regular format paper size B4 may be employed. If it is 216 mm, the regular format paper size A4 may be employed.

In a case where transmission with the regular format paper size is performed, this fact may be notified to the connected receiver side apparatus. In this case, the type of the regular format paper size may be notified to the connected receiver side apparatus.

A fourth embodiment of the present invention will now be described.

As a conventional facsimile apparatus capable of recording received information on a regular format paper size sheet, there is a known apparatus that is capable of reducing data in only the sub-scanning direction. If the length in the sub-scanning direction of received information is, after one page has been received, longer than the length of the recording paper in the sub-scanning direction by a predetermined magnification (for example, 1.1 times) or larger and as well as shorter by a predetermined magnification (for example, 1.5 times), recording is performed with a predetermined reduction ratio. In the residual cases, same magnification recording on one or a plurality of pages is performed.

As a facsimile apparatus capable of recording received information on the regular format paper size sheet, an apparatus has been known that is capable of recording data at an arbitrary magnification in the main scanning direction and the sub-scanning direction.

However, the foregoing conventional apparatuses have a problem that the operator on the receiver side apparatus cannot recognize whether or not information to be recorded is recorded at the same magnification, whether or not information is reduced in only the sub-scanning direction, whether or not reduction is performed in both the main scanning direction and sub-scanning direction with the same reduction ratio and whether or not reduction is performed in such a manner that the main scanning direction and the sub-scanning direction are reduced at individual reduction ratios.

Accordingly, the fourth embodiment provides a facsimile apparatus which enables the receiver side to easily recognize the selected same magnification recording or reduced recording if the same magnification or reduced recording of received image information is automatically selected and transmitted.

Figure 21:
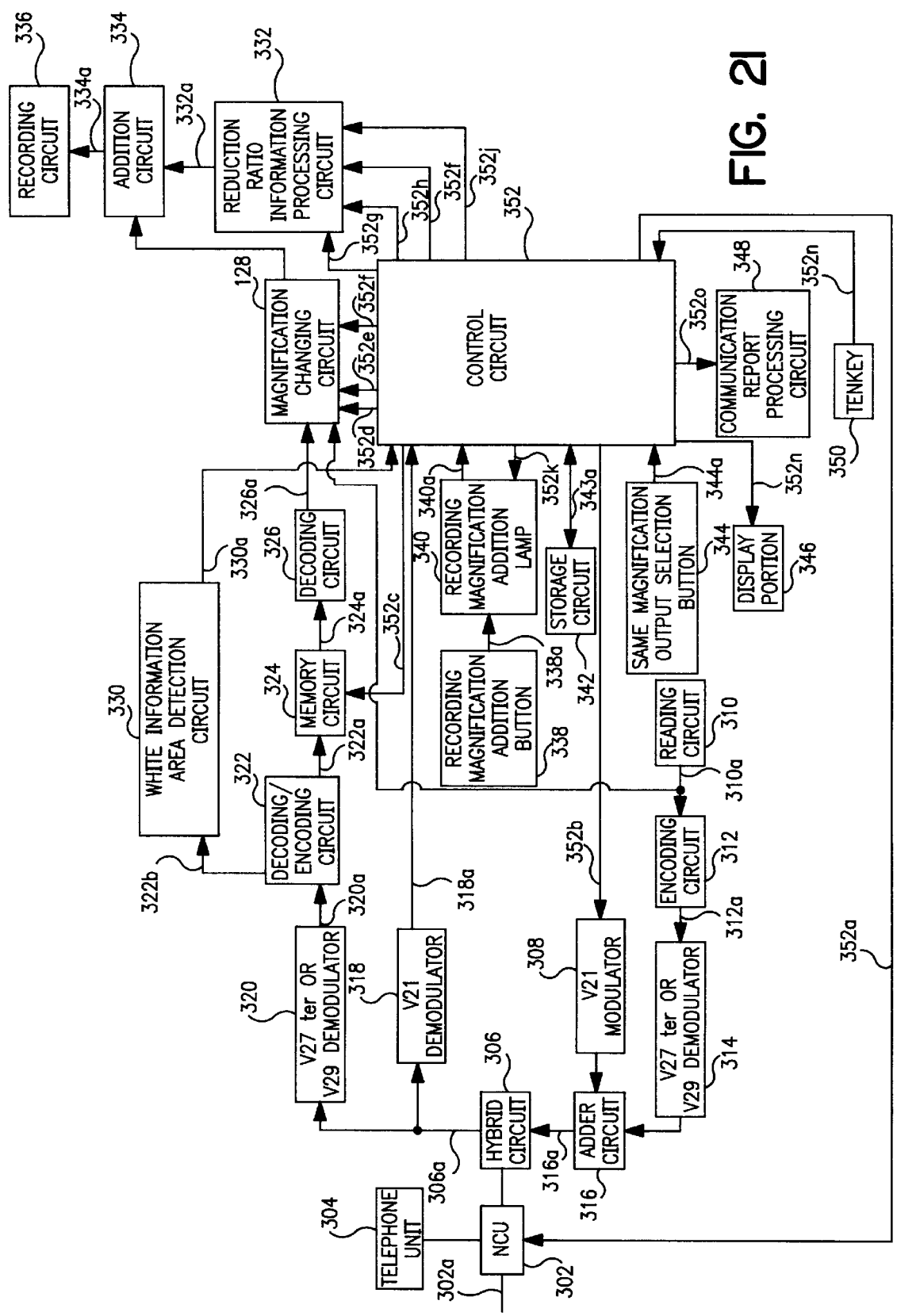
FIG. 21 is a block diagram which illustrates a fourth embodiment of the present invention.

FIG. 21 is a block diagram which illustrates the fourth embodiment.

An NCU (Network Control Unit) 302 is disposed to use a telephone network to communicate data or the like in such a manner that the NCU 302 is connected to a terminal of the telephone network to control the connection of the telephone network, switch data communication passages and hold a DC loop. The NCU 302 establishes the connection between a telephone line 302a to a telephone set 304 if the level of a signal (on a signal line 352a) supplied from a control circuit 352 is "0". The NCU 302 establishes the connection between the telephone line 302a and a facsimile apparatus if the level of the signal is "1". In a usual state, the telephone line 302a is connected to the telephone set 304.

A hybrid circuit 306 separates signals in a transmission system and signals in a receipt system from each other to transmit the signals supplied from an adder circuit 316 to the telephone circuit 302a through the NCU 302. The hybrid circuit 306 receives signals transmitted from the transmitting side through the NCU 302 to transmit the signals to a demodulator 320 and a V21 demodulator 318 through a signal line 306a.

A V21 modulator 308 is a modulator adapted to known CCITT recommendation V21 and arranged to modulate a procedure signal (on a signal line 352b) supplied from the control circuit 352 to transmit it to the adder circuit 316 through a signal line 308a.

A reading circuit 310 sequentially reads image signals of a transmitted original document for one line in the main scanning direction to make binary signal trains representing white and black, the reading circuit 310 transmitting data of the binary signal train to an encoding circuit 312 through a signal line 310a. The reading circuit 310 is composed of an image sensing device, such as a CCD (a Charge Coupled Device), and an optical system.

The encoding circuit 312 receives read data transmitted to the signal line 310a to encode (MH-encode or MR-encode) read data, the encoding circuit 312 being arranged to transmit encoded data through the signal line 312a.

A V27 ter or V29 modulator 314 receives encoded data from the signal line 312a to modulate it on the basis of known CCITT recommendation V27 ter (differential phase modulation) or V29 (orthogonal modulation), the V27 ter or V29 modulator 314 being arranged to transmit modulated data to the adder circuit 316 through a signal line 314a.

The adder circuit 316 is a circuit for adding outputs from the modulators 308 and 314 to each other. The output from the adder circuit 316 is transmitted to the hybrid circuit 306.

A V21 demodulator 318 demodulates data in accordance with known CCITT recommendation V21. The demodulator 318 receives the procedure signal from the hybrid circuit 306 through the signal line 306a to V21-demodulate it, the V21 demodulator 318 being arranged to transmit demodulated data to the control circuit 352 through a signal line 318a.

A V27 ter or V29 demodulator 320 is arranged to perform demodulation in accordance with known CCITT recommendation V27 ter or V29. The demodulator 320 receives demodulated image signal supplied from the hybrid circuit 306 to demodulate it, the demodulator 320 being arranged to transmit demodulated data to a decoding/encoding circuit 322 through a signal line 320a.

The decoding/encoding circuit 322 receives the signal transmitted to the signal line 320a to temporarily decode it, the decoding/encoding circuit 322 being arranged to transmit the decoded data to a signal line 322b. Further, it encodes information, which has been correctly received, in a K=8 MR mode, the decoding/encoding circuit 322 being arranged to transmit thus obtained data to a signal line 322a.

A memory circuit 324 is under control performed through a signal line 352c connected to the control circuit 352, stores encoded data transmitted to the signal line 322a and transmits stored data to a decoding circuit 326 through a signal line 324a.

The decoding circuit 326 is a circuit for decoding (MH-decoding or MR-decoding) data supplied through the signal line 326a and transmitting decoded data to a magnification changing circuit 328 through a signal line 326a.

The magnification changing circuit 328 is a circuit which receives the signal on the signal line 326a when a signal, the level of which is "0", has been transmitted to the signal line 352d. It receives the signal on the signal line 310a when a signal, the level of which is "1", has been transmitted to the signal line 352d. Thus, it changes the main scanning directional magnification with the magnification transmitted to the signal line 352e. In the sub-scanning direction, it transmits, to a signal line 328a, information, the magnification of which has been changed with the magnification transmitted to the signal line 352f.

A white information area detection circuit 330 receives a signal on the signal line 322b so as to detect white information areas. When it is detecting the white information area larger than a predetermined space, it transmits, to a signal line 330a, a signal, the level of which is "1". If it is not detecting an area of white information larger than a predetermined area, it transmits, to a signal line 330a, a signal, the level of which is "0".

A reduction ratio information processing circuit 332 is a circuit for processing information about the reduction ratio. In the circuit 332, if the level of the signal on a signal line 352g is 0 when an information output pulse representing the reduction ratio has been generated on a signal line 352h, only magnification information in the sub-scanning direction transmitted to the signal line 352j is received, and a dot pattern of the information is transmitted to the signal line 332a. If the level of the signal on the signal line 352g is 1, the reduction ratio information processing circuit 332 receives information about the magnification in the main scanning direction transmitted to the signal line 352i and information about the magnification in the sub-scanning direction transmitted to the signal line 352j and transmits a dot pattern of the information to the signal line 332a.

The adder circuit 334 is a circuit for receiving the signal transmitted to the signal line 328a and that transmitted to the signal line 332a and transmitting the result of the addition to the signal line 334a.

A recording circuit 336 receives the signal transmitted to the signal line 334a and sequentially records information for each line.

A recording magnification addition button 338 is a button for selecting whether or not the recording magnification is added to information to be recorded. When the button 338 is depressed, a depression pulse is generated on the signal line 338a.

A recording magnification addition lamp 340 is a lamp for indicating whether or not the recording magnification is added to information to be recorded. When a clear pulse has been generated on the signal line 352k, the lamp 340 is lit off, and then it repeats light on, lighting off and lighting on whenever the depression pulse has been generated in the signal line 338a. The lamp 340 transmits a signal, the level of which is "0", to a signal line 340a when it is lit off. It transmits a signal, the level of which is "1", to a signal line 340a when it is lit on.

Reference numeral 42 represents a circuit for registering whether or not the recording magnification is added to information to be recorded when the same magnification recording is performed in a case where setting is made in such a manner that the recording magnification is added to an image. The registration into the storage circuit 42 is performed through an operation portion (omitted from illustration) through a signal line 42a.

A same magnification output selection button 344 is a button for use when reduced image information is changed to the same magnification in both main scanning direction and sub-scanning direction and the same magnification image information is transmitted. When the button 344 has been depressed, a depression pulse is generated in the signal line 344a.

A display portion 346 receives information transmitted to a signal line 352n so as to display it.

A communication result report processing circuit 348 is a circuit that receives a signal transmitted to a signal line 352o so as to process a communication result report.

A ten key 350 transmits information representing the depressed ten key to a signal line 350a.

The control circuit 352 stores received image information and controls in such a manner that image information is, after one page has been received, reduced in both the main scanning direction and sub-scanning direction and recorded. In particular in this embodiment, it performs control in such a manner that the reduction ratio in the main scanning direction and sub-scanning direction is recorded on a recording paper sheet on which image information has been recorded. Further, the control circuit 352 performs control in such a manner that it selects whether or not information about the recording magnification is added to the recorded image and adds the recording magnification to the image if the addition of information about the recording magnification has been selected.

Figure 22:
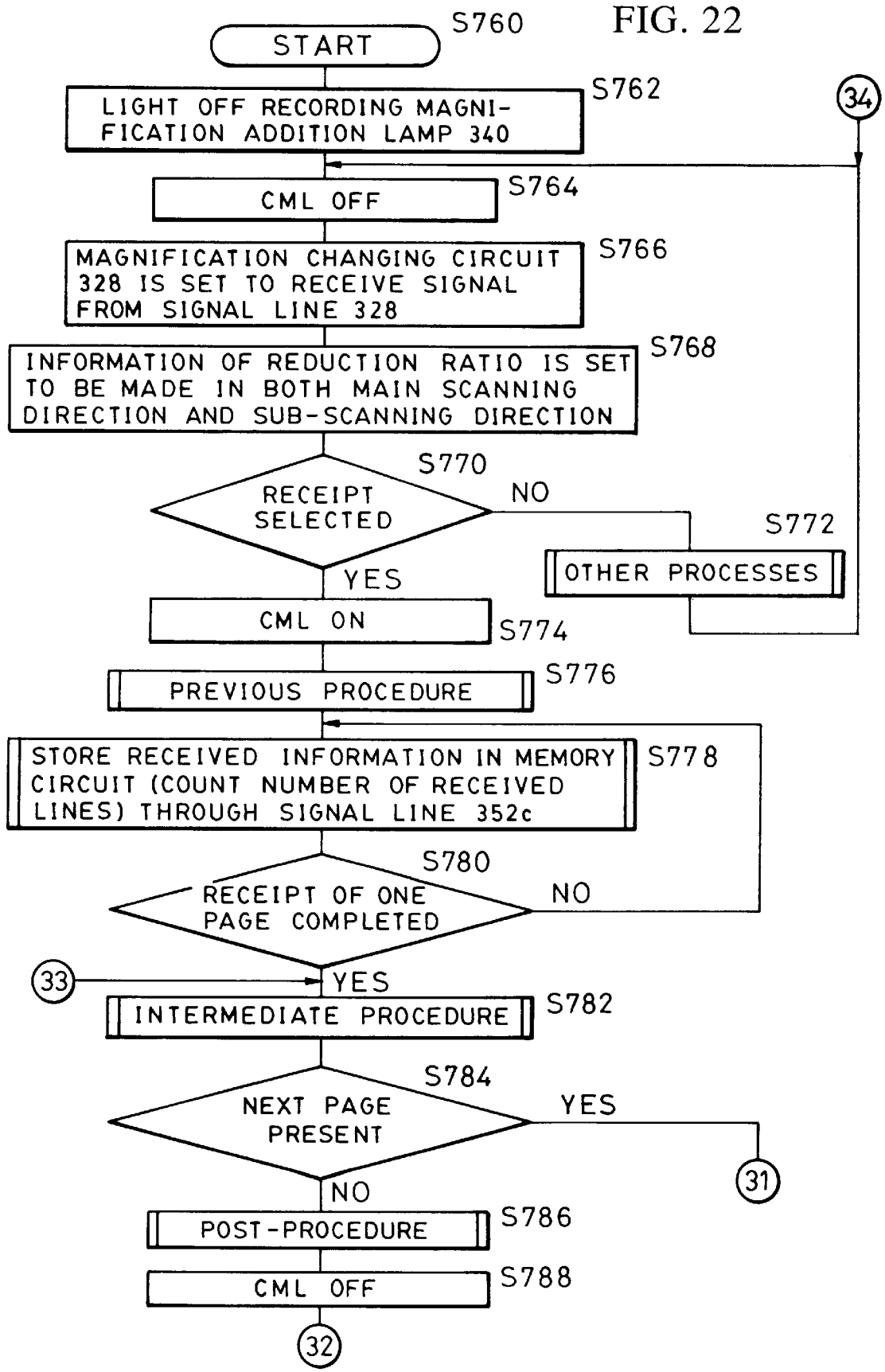
FIG. 22 is a flow chart which illustrates the operation of the fourth embodiment.
Figure 23:
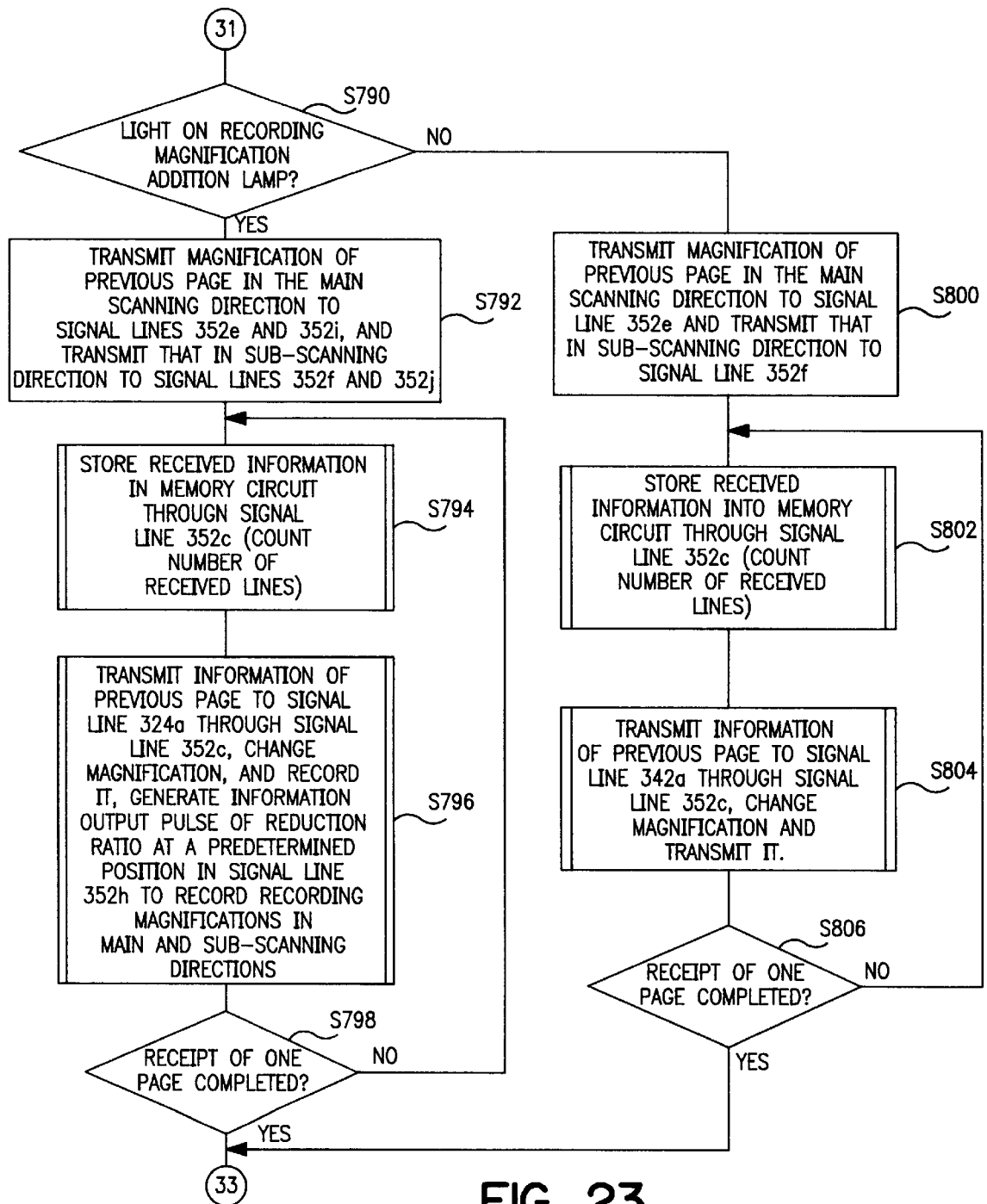
FIG. 23 is a flow chart which illustrates the operation of the fourth embodiment.
Figure 24:
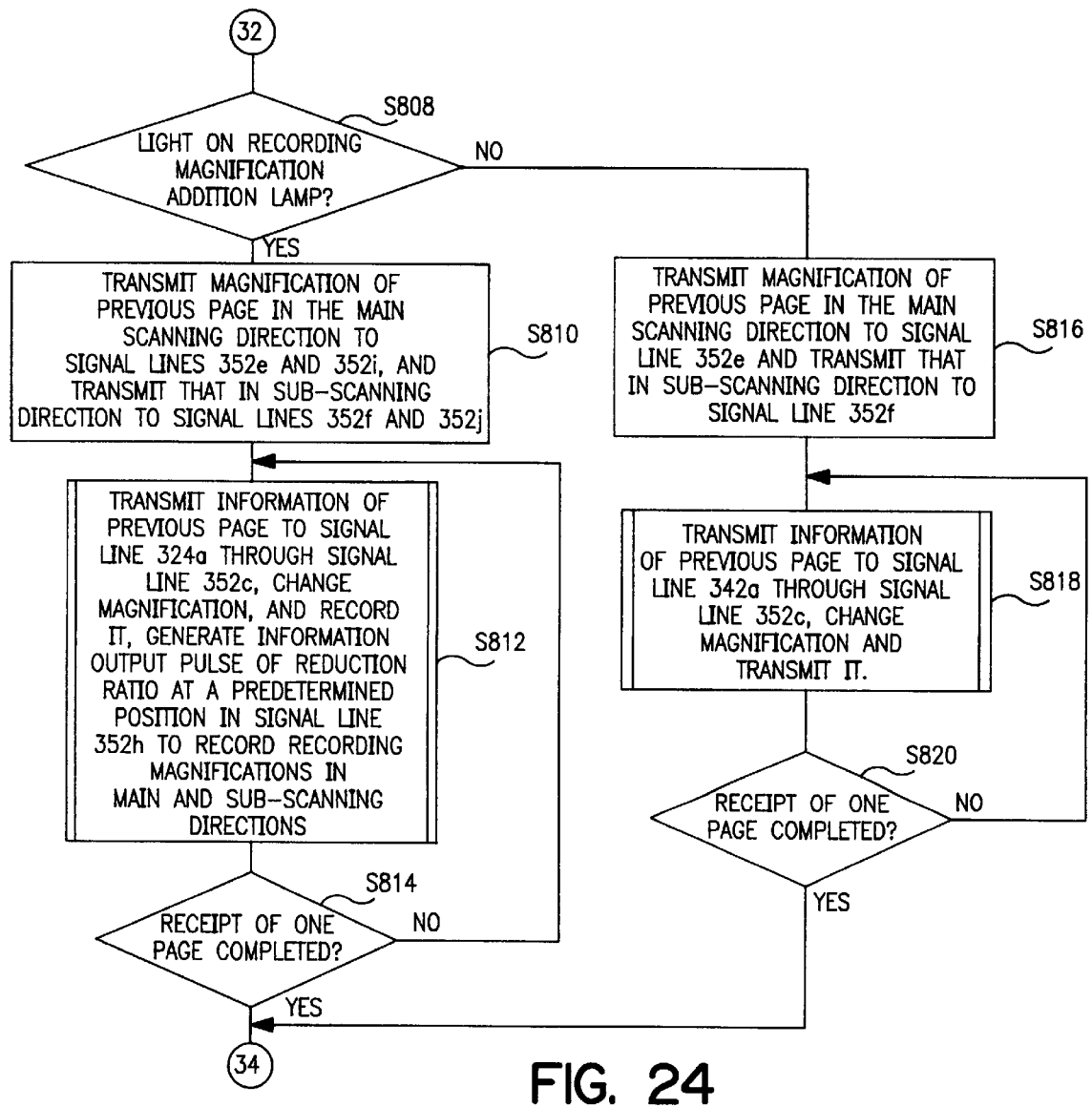
FIG. 24 is a flow chart which illustrates the operation of the fourth embodiment.

FIGS. 22 to 24 collectively illustrate a flow chart which illustrates the operation of this embodiment.

In step S762, the clear pulse is generated in the signal line 352k and the recording magnification lamp 340 is lit off. In step S764, a signal, the level of which is "0", is transmitted to the signal line 352a so as to deactivate the CML.

In step S766, a signal, the level of which is "0", is transmitted to the signal line 352d, and the magnification changing circuit 28 is set to receive the signal from the signal line 326a. In step S768, a signal, the level of which is "1", is transmitted to the signal line 352g, and setting is so made as to process information about the reduction ratio in both main scanning direction and sub-scanning direction.

Then, in step S770, whether or not receipt has been selected is discriminated. If the receipt has been selected, the flow proceeds to step S774. If the receipt has not been selected, the flow proceeds to step S772 in which other processes are performed.

In step S774, a signal, the level of which is "1", is transmitted to the signal line 352a so as to activate the CML. In step S776, previous procedures are performed. In step S778, received information is stored into the memory circuit 324 through the signal line 352c. In this memory circuit 324, the number of the received lines are counted.

Then, in step S780, whether or not receipt of one page has been completed is discriminated. If the receipt of one page has been completed, the flow proceeds to step S782. If the receipt of one page has not been completed, the flow proceeds to step S778.

In step S782, intermediate procedures are performed. In step S784, whether or not the next page is present is discriminated. If the next page is present, the flow proceeds to step S790. If no next page is present, the flow proceeds to step S786.

In step S790, the signal in the signal line 340a is received so as to discriminate whether or not the recording magnification addition lamp 340 is lit on. If the recording magnification addition lamp 340 is lit on, the flow proceeds to step S792. If it is lit off, the flow proceeds to step S800.

In step S792, the magnification of the previous page in the main scanning direction is transmitted to signal lines 352e and 352i. The magnification in the sub-scanning direction is transmitted to the signal lines 352f and 352j. In step S794, received information is, through the signal line 352c, stored in the memory circuit 324. In the memory circuit 324, the number of received lines is counted.

Then, in step S796, information about the previous page is, through the signal line 352c, transmitted to the signal line 324a so that its magnification is changed and the information is recorded. At a predetermined position, an information output pulse representing the reduction ratio is generated in the signal line 352h so that information representing the recording magnification in the main scanning direction and sub-scanning direction is recorded.

Then, in step S798, whether or not receipt of one page has been completed is discriminated. If the receipt of one page has been completed, the flow returns to step S782. If the receipt of one page has not been completed, the flow returns to step S794.

In step S800, the magnification of the previous page in the main scanning direction is transmitted to the signal line 352e. The magnification in the sub-scanning direction is transmitted to the signal line 352f. In step S802, received information is stored in the memory circuit 324 through the signal line 352c. In this state, the number of received lines is counted. In step S804, information about the previous page is, through the signal line 352c, transmitted to the signal line 324a so that the magnification is changed and the information is recorded.

Then, in step S806, whether or not receipt of one page has been completed is discriminated. If the receipt of one page has been completed, the flow returns to step S782. If the receipt of one page has not been completed, the flow returns to step S802.

In step S786, post-procedures are performed. In step S788, a signal, the level of which is "0", is transmitted to the signal line 352a so as to deactivate the CML.

Then, in step S808, the signal in the signal line 340a is received so as to discriminate whether or not the recording magnification addition lamp 340 has been lit on. If the recording magnification addition lamp 340 has been lit on, the flow proceeds to step S810. If it has been lit off, the flow proceeds to step S816.

In step S810, the magnification in the main scanning direction of the previous page is transmitted to the signal lines 352e and 352i. The magnification in the sub-scanning direction is transmitted to the signal lines 352f and 353j.

In step S812, information about the previous page is, through the signal line 352c, transmitted to the signal line 324a so that magnification of the information is changed and then the information is recorded. At a predetermined position, an information output pulse representing the reduction ratio is generated in the signal line 352h so that the recording magnification in the main scanning direction and sub-scanning direction is recorded.

Then, in step S814, whether or not recording of one page has been completed is discriminated. If recording of one page has been completed, the flow returns to step S764. If recording of one page has not been completed, the flow returns to step S812.

In step S816, the magnification of the previous page in the main scanning direction is transmitted to the signal line 352e. The magnification in the sub-scanning direction is transmitted to the signal line 352f. In step S818, information about the previous page is, through the signal line 352c, transmitted to the signal line 324a so that the magnification of information is changed and the information is recorded.

Then, in step S820, whether or not recording of one page has been completed is discriminated. If recording of one page has been completed, the flow returns to step S764. If recording of one page has not been completed, the flow returns to step S818.

Although whether or not the recording magnification is, in the fourth embodiment, added to information to be recorded is discriminated in each page, another arrangement may be employed. If the recording magnification addition lamp 340 has been lit on at the beginning of the one communication, the recording magnification is added to information to be recorded during one communication operation regardless of the state of the foregoing lamp 340.

Although the recording magnification addition lamp 340 is, in the fourth embodiment, not cleared at each communication, the arrangement is not limited to this but the same may be cleared at each communication.

Although the fourth embodiment is arranged in such a manner that information is reduced in the main scanning direction and sub-scanning direction, the structure may be arranged in such a manner that information is reduced in only the sub-scanning direction.

In order to embody the foregoing control, a signal, the level of which is "0", is, in step S768, transmitted to the signal line 352g and setting is made in such a manner that information about the reduction ratio in only the sub-scanning direction is made. In each of steps S792, S800, S810 and S816, setting of the sub-scanning direction is solely performed and setting of the main scanning direction is not performed.

Although the recording magnification is added to the image also at the magnification changing recording operation in a state where the addition of the recording magnification to the image has been selected, another structure may be employed in which the recording magnification is not added to the image at the time of the same magnification recording in a state where the addition of the recording magnification to the image has been selected.

In this case, the different portions from those shown in FIGS. 22 to 24 will now be described. If an affirmative discrimination has been made in step S790, a discrimination whether or not same magnification recording is performed is additionally performed. If the same magnification recording is performed, the flow proceeds to step S800. If the same magnification recording is not performed, the flow proceeds to step S792. Further, a discrimination whether or not same magnification recording is performed is additionally performed if an affirmative discrimination is made in step S808. If same magnification recording is performed, the flow proceeds to step S816. If same magnification recording is not performed, the flow proceeds to step S810.

If same magnification recording is performed in a state where the addition of the recording magnification to information to be recorded, whether or not the recording magnification is added to information to be recorded may be determined in accordance with the registration state in the storage circuit 42.

Only different portions of control to be performed in the foregoing arrangement from the control shown in FIG. 22 will now be described with reference to FIG. 26.

Figure 26:
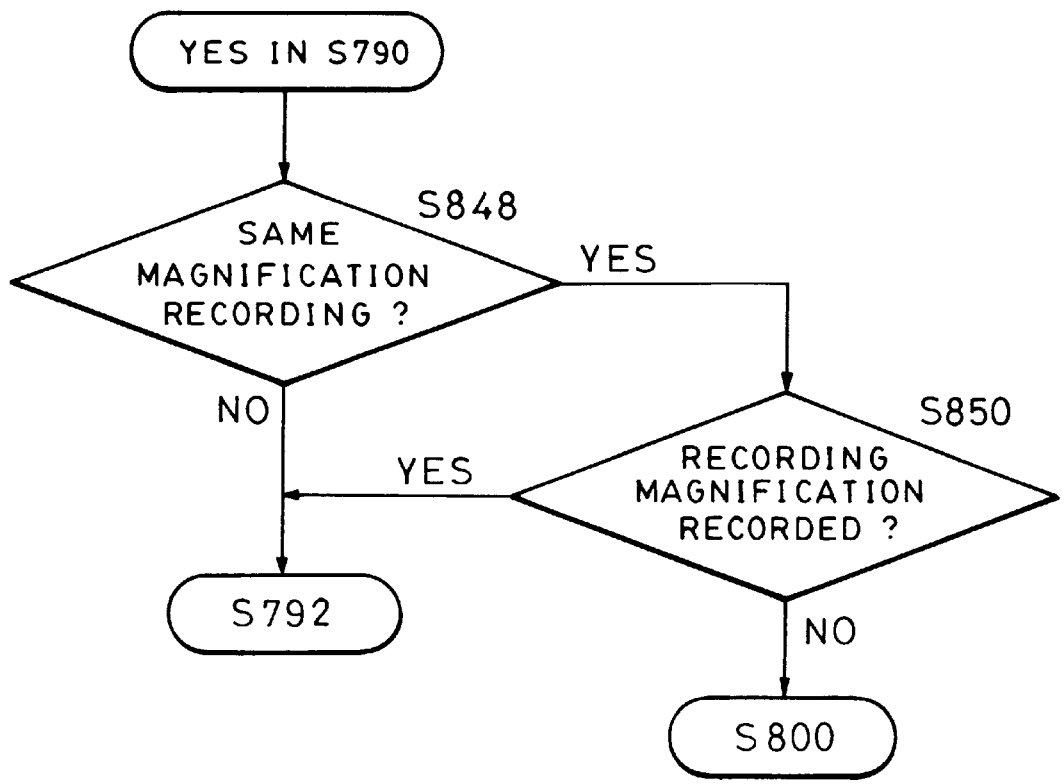
FIG. 26 is two parts of a flow chart which illustrates the operation of a modification of the fourth embodiment.
Figure 26:
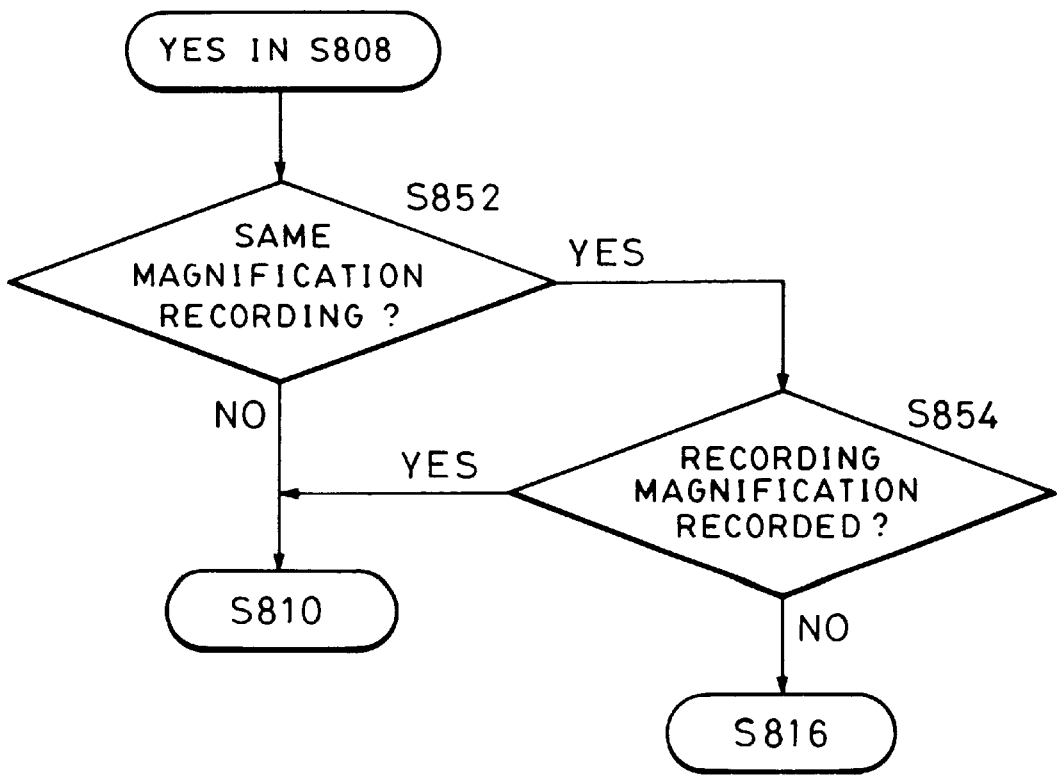

If addition of the recording magnification is selected in step S790, the flow proceeds to step S848 shown in FIG. 26.

In step S848, whether or not same magnification recording is performed is discriminated. If same magnification recording is performed, the flow proceeds to step S850. If a negative case, the flow proceeds to step S792 shown in FIG. 23.

In step S850, if the addition of the recording magnification to the image to be recorded at the time of performing same magnification recording has been registered in the storage circuit 342, the flow proceeds to step S792. If the addition of the recording magnification to the image to be recorded at the time of performing same magnification recording has not been registered, the flow proceeds to step S800 shown in FIG. 23.

In step S852, the same control as that in step S848 is performed. In step S854, the same control as that in step S800 is performed.

The addition of the recording magnification to the image may be performed by receiving the signal in the signal line 330a so as to add the recording magnification to a white information portion in image information.

Further, the reduction ratio for each page may be added to the communication result report. If the recording magnification is recorded on the communication result report, addition of the recording magnification to image information may be omitted.

Same magnification recording may be performed by receiving the recording magnification of recorded image information and by recording the inverse number of the magnification.

Figure 25:
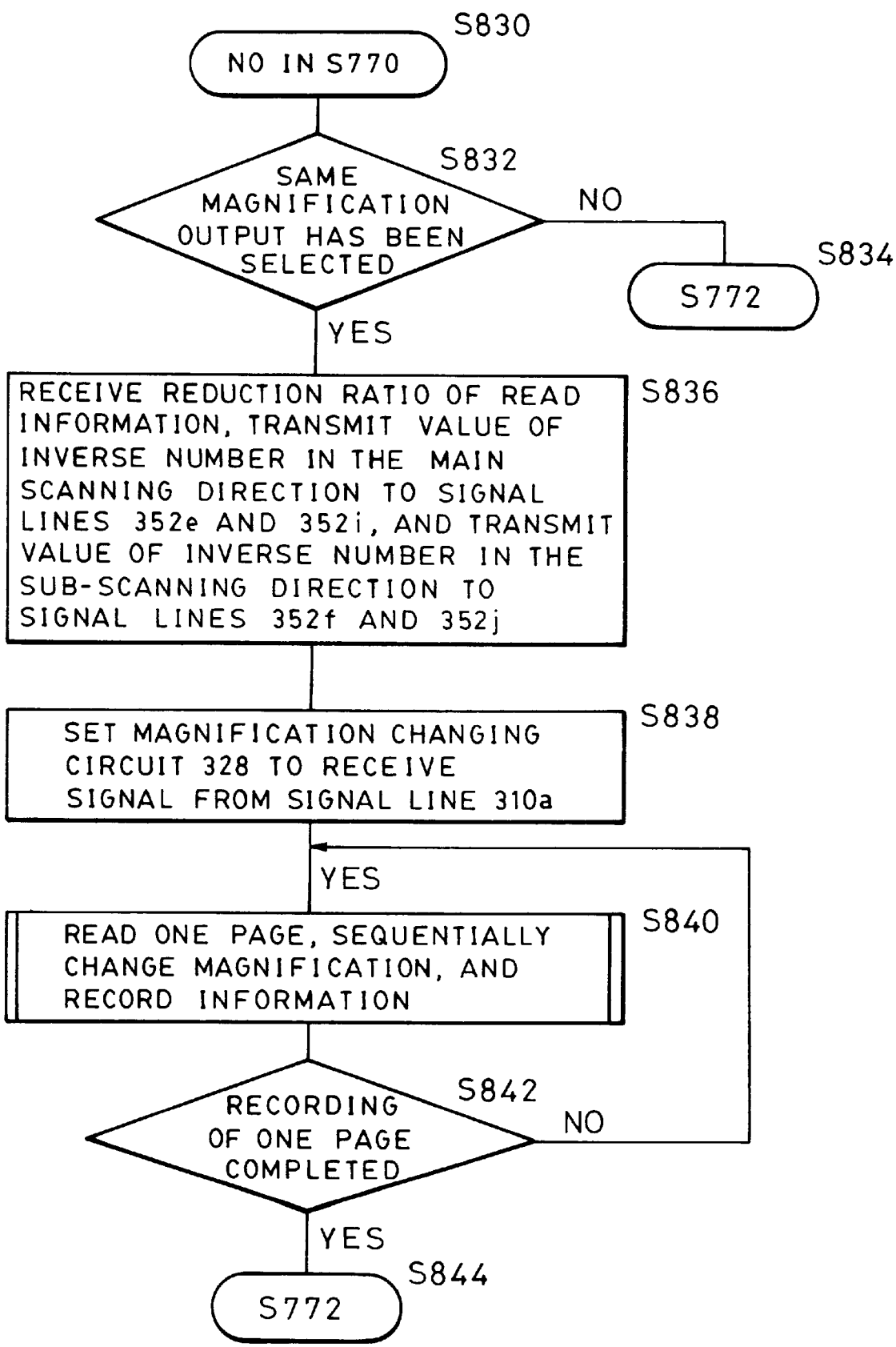
FIG. 25 is a flow chart which illustrates the operation of a modification of the fourth embodiment.

FIG. 25 is a flow chart which illustrates different portions of the operation to be performed in the foregoing case from those shown in FIGS. 22 to 24.

Step S830 corresponds to negative discrimination made is step S770. In step S832, the signal in the signal line 344a is received so as to discriminate whether or not the same magnification output has been selected. If the same magnification output has been selected, the flow proceeds to step S836. If the same magnification output has not been selected, the flow proceeds to step S834.

Step S834 corresponds to step S772. In step S836, the recording magnification of information to be transmitted with the same magnification is received, and the inverse value of the magnification in the main scanning direction is transmitted to the signal lines 352e and 352i. Then, the inverse number of the magnification in the sub-scanning direction is transmitted to the signal lines 352f and 352j.

In step S838, a signal, the level of which is "1", is transmitted to the signal line 352d so that setting is made in such a manner that the magnification changing circuit 328 receives the signal in the signal line 310a. In next step S840, one page is read, the magnification of the information items is changed and information items are sequentially recorded. In this state, the information output pulse representing the reduction ratio is not transmitted to the signal line 352h and the reduction ratio is not recorded.

In step S842, whether or not recording of one page has been completed is discriminated. If recording of one page has been completed, the flow proceeds to step S844 (corresponding to step S772). If recording of one page has not been recorded, the flow proceeds to step S840.

In the operation shown in FIG. 25, a stamp or information representing the same magnification may be added after the magnification has been changed.

As described above, according to the first embodiment, received information of a plurality of pages is recorded on one page of the regular format cut sheet under control for making the receiver side apparatus perform the following operations: the number of pages of received information is decided to be recorded on one page of the regular format cut sheet correspondingly to the fineness of received information; received information of a plurality of pages of plural types is recorded on one page of the regular format cut sheet; the direction of rotation of received information is set correspondingly to a plurality of pages of plural types; recording which can be coped with filing recording is performed; the direction of rotation of received information is set correspondingly to recording data on both right side and the reverse side; and the foregoing setting is instructed from the transmitter side apparatus to the receiver side apparatus. Therefore, a system, which can easily be operated, can be provided.

According to the second embodiment, in a case where thermal transference recording, BJ recording or LBP recording which comprises the simply-decoding means and in which the number of received lines cannot be recognized in the G3 mode is performed on the regular format paper size recording paper, an effect can be obtained in that receipt of information from the transmitter side apparatus, which is able to record data with the same magnification, can be recorded with the same magnification, and receipt of information, which is somewhat longer than one page, from the transmitter side apparatus can be recorded on one page in a reduced manner.

According to the third embodiment, an effect can be obtained in that, if the receiver side apparatus uses the regular format paper size recording sheet, the regular format paper size is transmitted or the type of the size is instructed so as to transmit the type of the regular format paper size. If the receiver side apparatus uses a paper roll or the receiver side, for example, a design studio, requires the same magnification information, information can be transmitted with the same magnification. Therefore, an apparatus, which can significantly easily be used, can be provided.

According to the fourth embodiment, the operator on the receiver side is able to recognize whether or not the received information is the same magnification information or reduction ratio of reduced information. Therefore, erroneous recognition of a drawing or the like due to the difference in the reduction ratio can be prevented. By supplying the magnification actually used in recording and by recording the inverse number of the magnification, an effect can be obtained in that recording of the same magnification information can easily be performed.

Although the invention has been described in its preferred form with a certain degree of particularly, it is understood that the present disclosure of the preferred form can be changed in the details of construction and the combination and arrangement of parts may be resorted to without departing from the spirit and the scope of the invention as hereinafter claimed.

What is claimed is:

1. A facsimile apparatus for recording received information for a plurality of pages on one sheet of regular format cut sheets, said facsimile apparatus comprising:

receiving means for receiving image information; and number setting means for setting a number of pages of received information to be recorded on one sheet of the regular format cut sheets, wherein the number of pages of the received information to be recorded on the one sheet is automatically determined in accordance with a fineness of the received information, and wherein said number setting means is instructed from a transmitter side apparatus to perform its setting operation.

2. A facsimile apparatus according to claim 1, further comprising rotation direction setting means for setting a rotation direction of the received information corresponding to the number of pages of the received information to be recorded on the one sheet in a case where received information of a plurality of pages is recorded on one sheet.

3. A method of recording received information for a plurality of pages on one sheet of regular format cut sheets using a receiving side apparatus, said method comprising the steps of:

receiving image information at the receiving side apparatus;

setting a number of pages of received information to be recorded on one sheet of the regular format cut sheets, wherein said setting step comprises the step of automatically determining the number of pages of the received information to be recorded on the one sheet in accordance with a fineness of the received information; and receiving an instruction from a transmitter side apparatus to the receiving side apparatus so that the receiver side apparatus performs said setting step.

4. A method according to claim 3, further comprising the step of setting a rotation direction of the received information corresponding to the number of pages of the received information to be recorded on the one sheet in a case where received information of a plurality of pages is recorded on one sheet.

* * * * *

UNITED STATES PATENT AND TRADEMARK OFFICE
CERTIFICATE OF CORRECTION

PATENT NO. : 5,917,612
DATED : June 29, 1999
INVENTOR(S) : TAKEHIRO YOSHIDA

It is certified that error appears in the above-identified patent and that said Letters Patent is hereby corrected as shown below:

Sheet 3 of 26
FIGURE 3

Sheet 3, "TWO SHEETS OF RECEIVED INFORMATION IS RECORDED" should read --TWO SHEETS OF RECEIVED INFORMATION ARE RECORDED-- and "AS UPPER PORTION, AND" should read --AS UPPER POTION AND--.

Sheet 6 of 26
FIGURE 6

Sheet 6, "DEDUCTION CIRCUIT" should read --REDUCTION CIRCUIT-- and "V29 DEMODULATOR" (118) should read --V29 MODULATOR--.

FIGURE 7

Sheet 7, "DOSE" should read --DOES--.

FIGURE 12

Sheet 12, "V29 DEMODULATOR" (222) should read --V29 MODULATOR--.

FIGURE 21

Sheet 21, "V29 DEMODULATOR" (314) should read --V29 MODULATOR--.

COLUMN 1

Line 62, "fist" should read --first--.

UNITED STATES PATENT AND TRADEMARK OFFICE
CERTIFICATE OF CORRECTION

PATENT NO. : 5,917,612
DATED : June 29, 1999
INVENTOR(S) : TAKEHIRO YOSHIDA

It is certified that error appears in the above-identified patent and that said Letters Patent is hereby corrected as shown below:

COLUMN 2

Line 7, "flow" should read --flow chart--.

COLUMN 5

Line 17, "is" should read --are--; and
Line 19, "is" should read --are--.

COLUMN 6

Line 63, "made" should read --made,--.

COLUMN 7

Line 23, "to be" (2nd occurrence) should be deleted; and
Line 34, "90" should read --90°--.

COLUMN 17

Line 63, "o n" should read --on--.

COLUMN 20

Line 65, "$364x^1/_{07}$" should read --$364x^1/_{0.7}$--.

COLUMN 21

Line 1, "$364x^1/_{07}$" should read --$364x^1/_{0.7}$--; and
Line 55, "not" should read --no--.

UNITED STATES PATENT AND TRADEMARK OFFICE
CERTIFICATE OF CORRECTION

PATENT NO. : 5,917,612
DATED : June 29, 1999
INVENTOR(S) : TAKEHIRO YOSHIDA

It is certified that error appears in the above-identified patent and that said Letters Patent is hereby corrected as shown below:

COLUMN 30

Line 65, "is" should read --in--.

Signed and Sealed this

Thirteenth Day of June, 2000

*Attest:*

Q. TODD DICKINSON

*Attesting Officer*     *Director of Patents and Trademarks*